United States Patent

Ohshita et al.

[11] Patent Number: 5,949,588
[45] Date of Patent: Sep. 7, 1999

[54] WIDE ANGLE LENS

[75] Inventors: Koichi Ohshita; Atsushi Shibayama, both of Tokyo, Japan

[73] Assignee: Nikon Corporation, Tokyo, Japan

[21] Appl. No.: 09/009,129

[22] Filed: Jan. 20, 1998

Related U.S. Application Data

[63] Continuation-in-part of application No. 08/658,460, Jun. 5, 1996.

[51] Int. Cl.$^6$ .............................. G02B 13/04; G02B 3/02

[52] U.S. Cl. ........................................... 359/753; 359/716

[58] Field of Search .................................. 359/753, 716, 359/717, 642, 646, 645, 651, 661, 689, 691, 748, 762, 793, 797

[56] References Cited

U.S. PATENT DOCUMENTS 4,525,038  6/1985  Muller ..................................... 350/462

Primary Examiner—Frank G. Font
Assistant Examiner—Michael P. Stafia
Attorney, Agent, or Firm—Vorys, Sater, Seymour and Pease LLP

[57] ABSTRACT

A super-wide angle lens, sequentially from an object side, comprises a first negative lens L1, a second negative lens L2, and a third positive lens L3. The first negative lens L1 with its concave surface toward an image side has an image-side surface with a curvature larger than that on an object-side surface. The second negative lens L2 is disposed at a predetermined spacing from the first negative lens L1 and takes a negative meniscus shape with its convex surface toward the object side. The third positive lens L3 has its convex surface toward the object side.

16 Claims, 33 Drawing Sheets

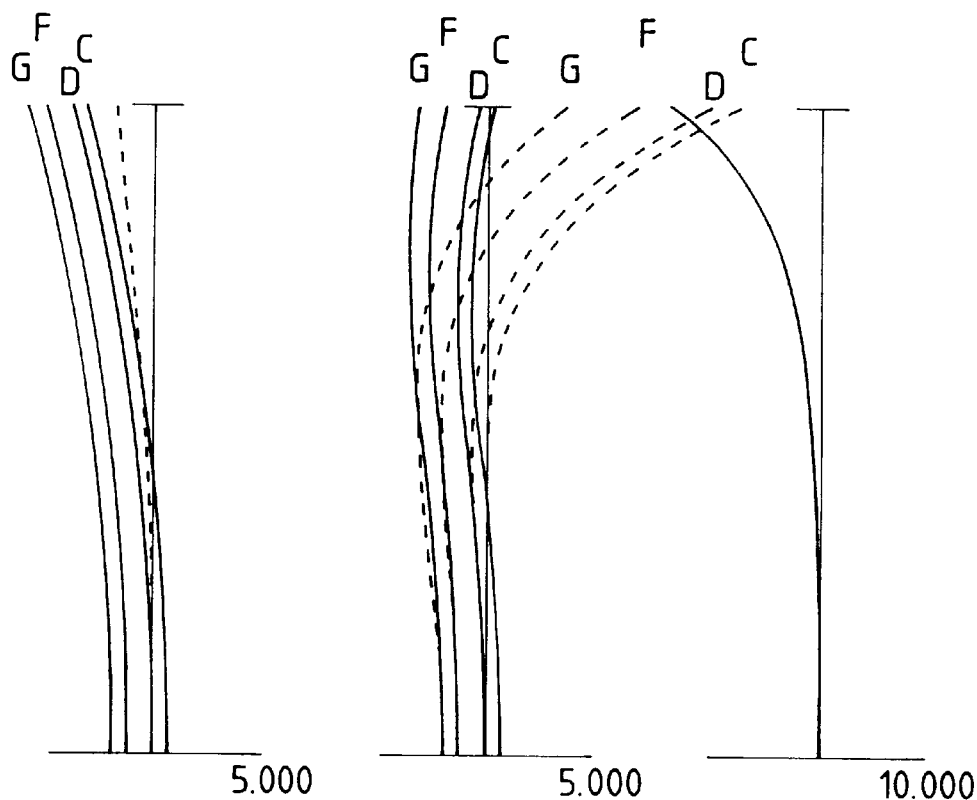
FIG. 2A  
SPHERICAL ABERRATION  
FNO=8.25
FIG. 2B  
ASTIGMATISM  
Y=110.00
FIG. 2C  
DISTORTION  
Y=110.00
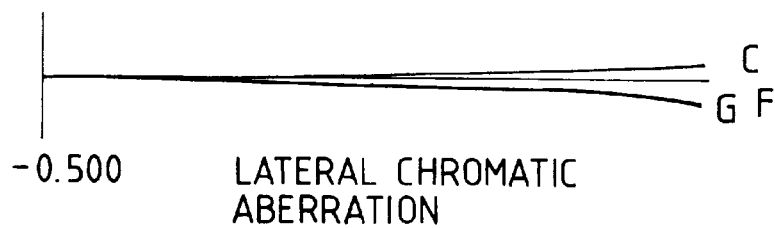
FIG. 2D
LATERAL CHROMATIC ABERRATION

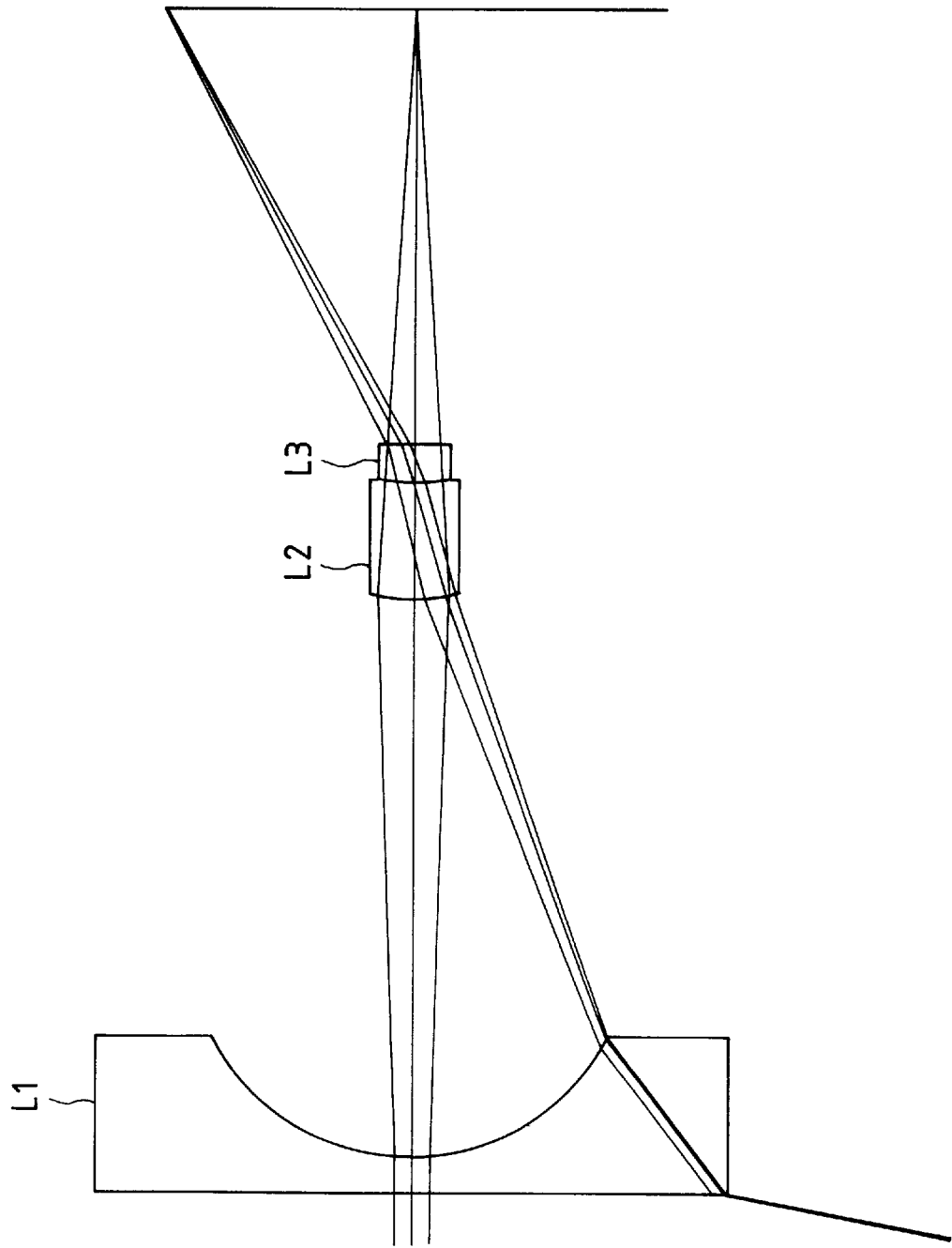

SPHERICAL ABERRATION   ASTIGMATISM   DISTORTION
FNO=8.23   Y=110.00   Y=110.00

LATERAL CHROMATIC ABERRATION

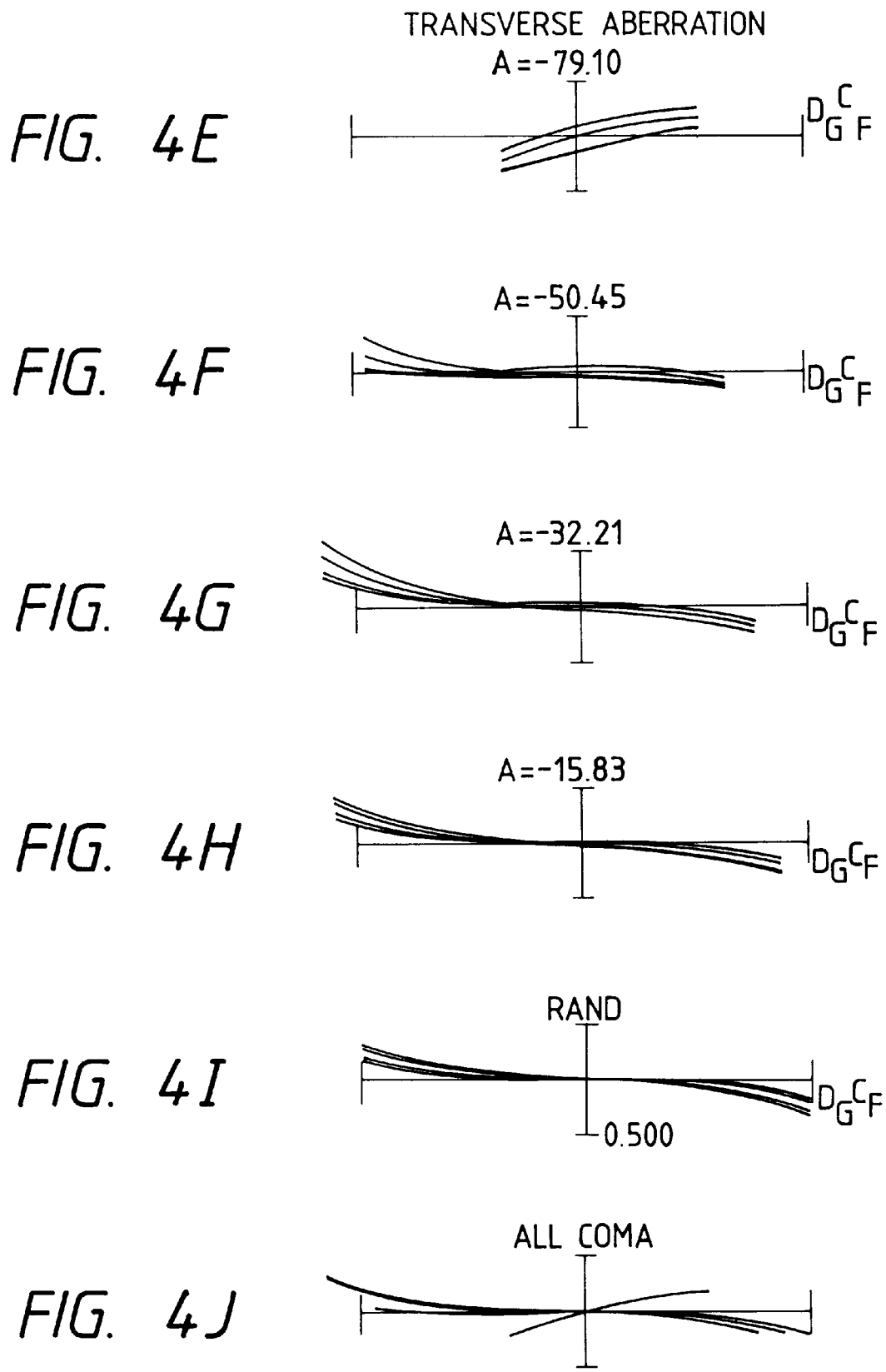

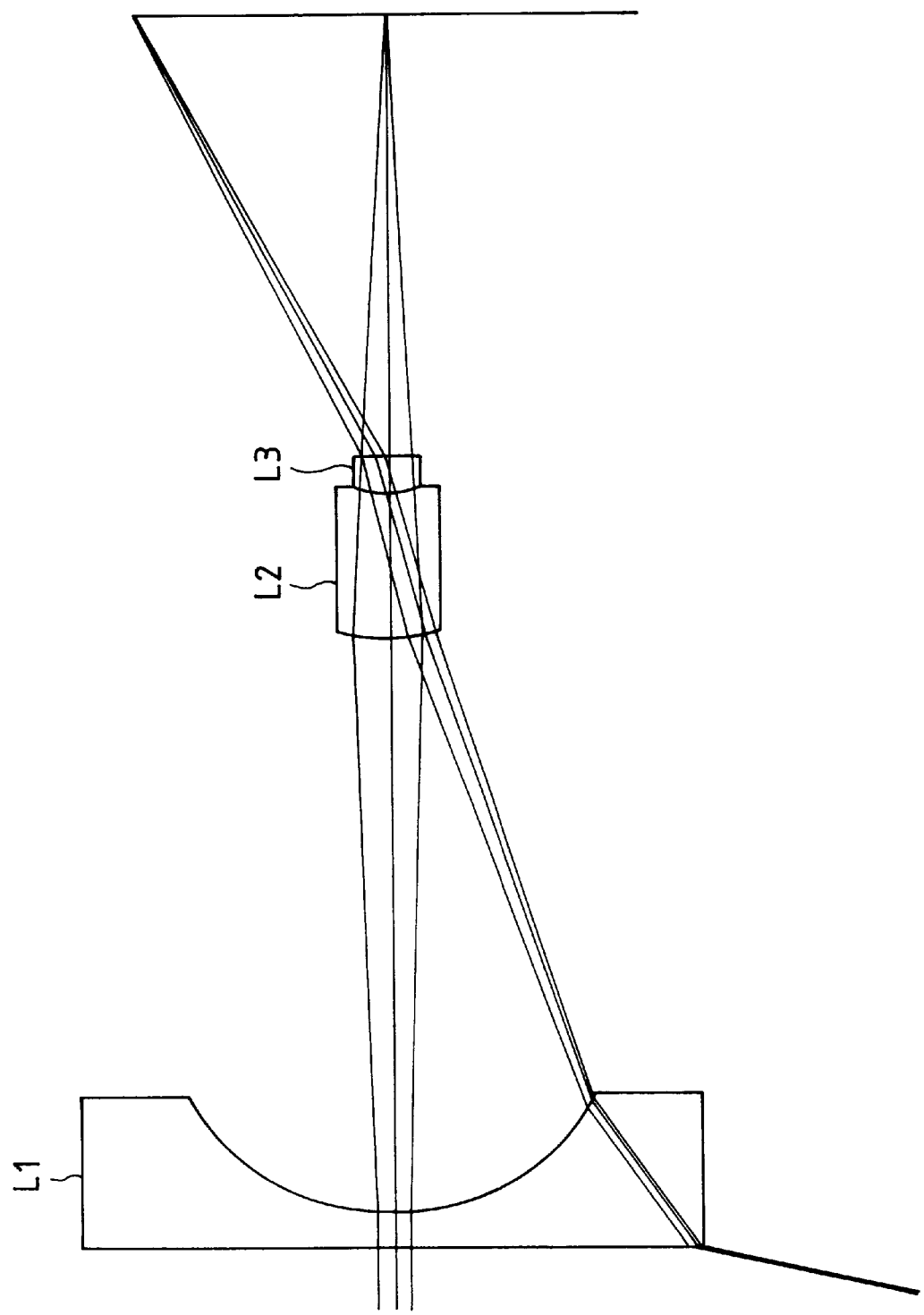

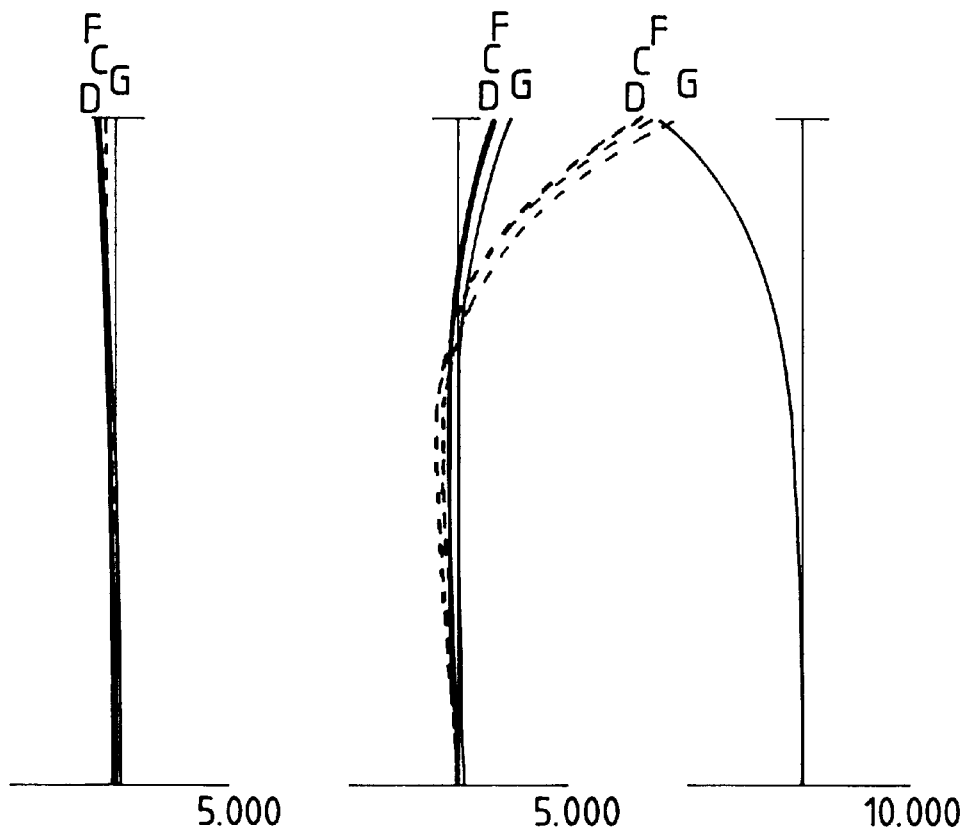
FIG. 6A SPHERICAL ABERRATION FNO=8.24
FIG. 6B ASTIGMATISM Y=110.00
FIG. 6C DISTORTION Y=110.00
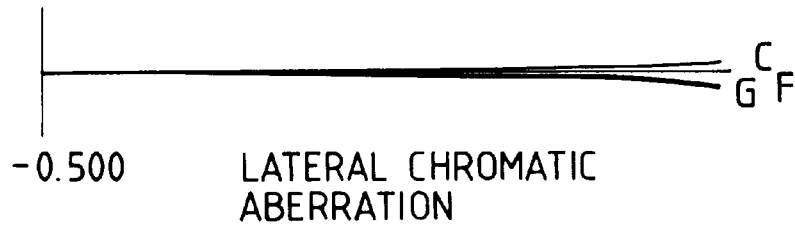
FIG. 6D LATERAL CHROMATIC ABERRATION

TRANSVERSE ABERRATION
A=-78.45

A=-50.37

A=-32.19

A=-15.83

RAND
-0.500

ALL COMA

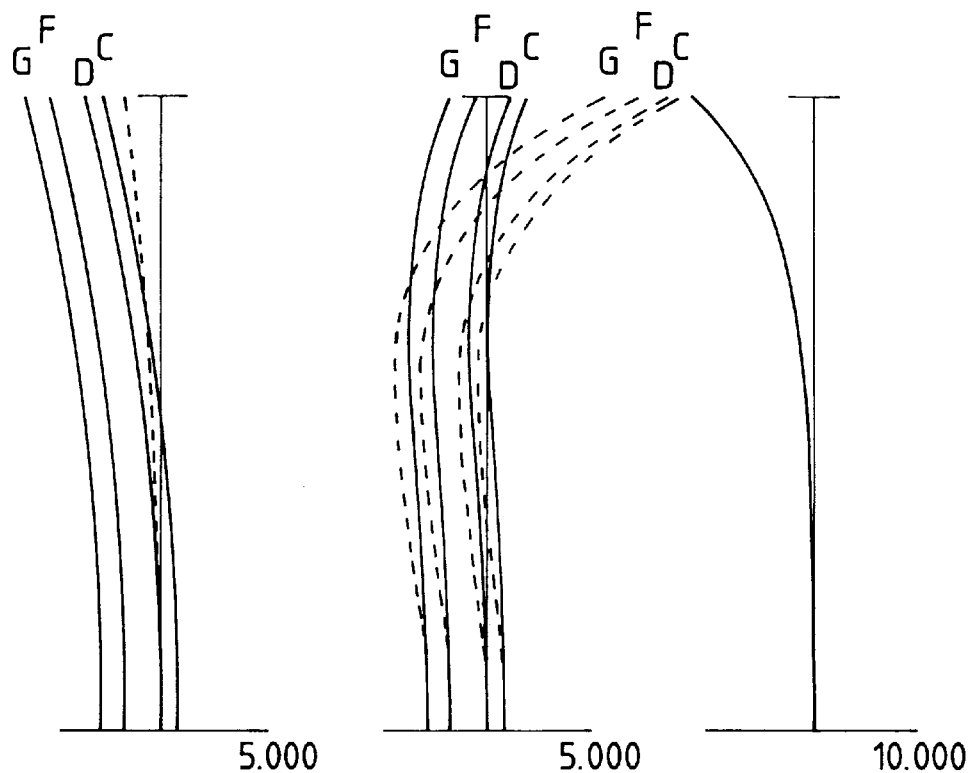
FIG. 8A
SPHERICAL ABERRATION
FNO= 8.26
FIG. 8B
ASTIGMATISM
Y=110.00
FIG. 8C
DISTORTION
Y=110.00
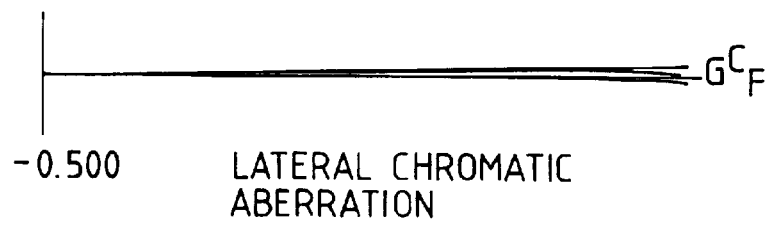
FIG. 8D
LATERAL CHROMATIC ABERRATION

TRANSVERSE ABERRATION
A = −76.88

A = −50.14

A = −32.14

A = −15.82

RAND
−0.500

ALL COMA

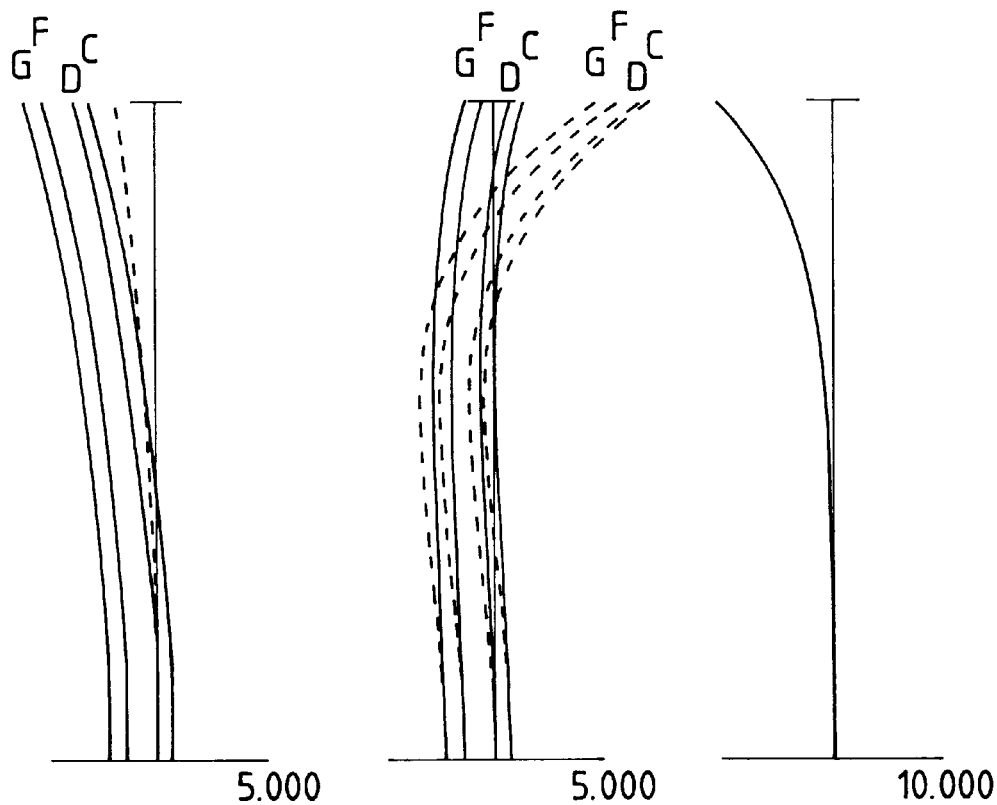
FIG. 10A
SPHERICAL ABERRATION
FNO=8.26
FIG. 10B
ASTIGMATISM
Y=110.00
FIG. 10C
DISTORTION
Y=110.00
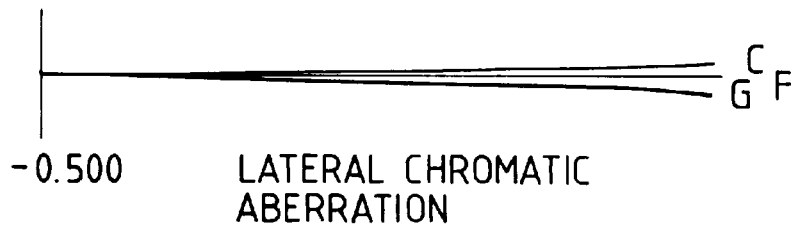
FIG. 10D
−0.500    LATERAL CHROMATIC ABERRATION

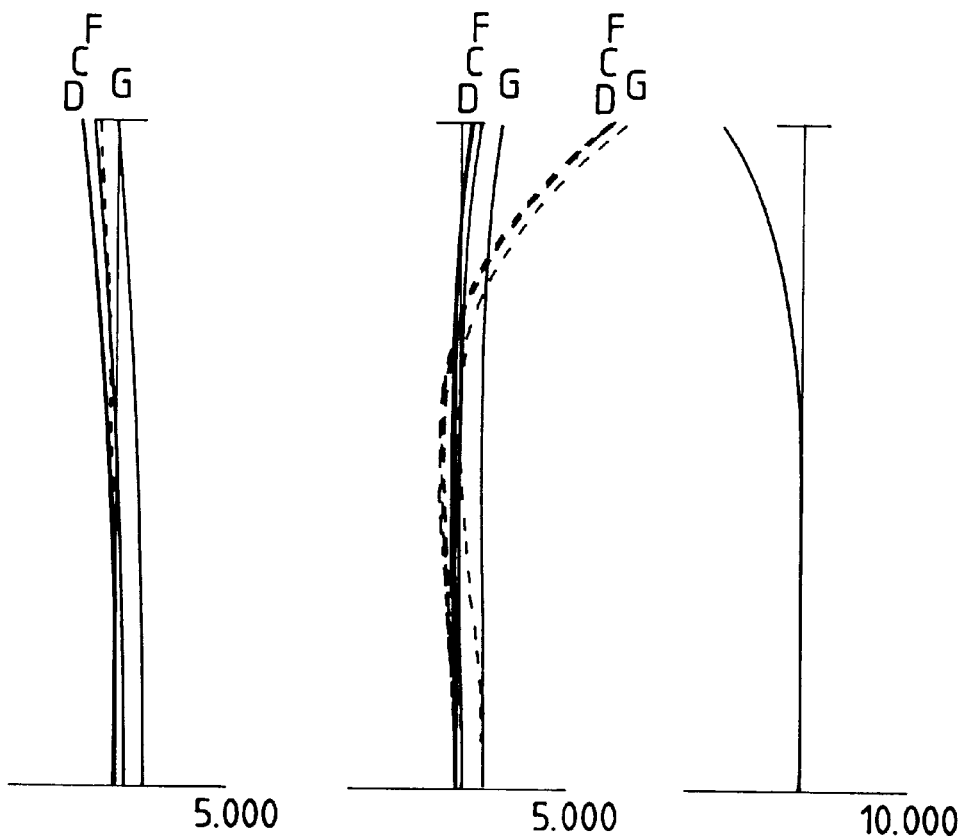
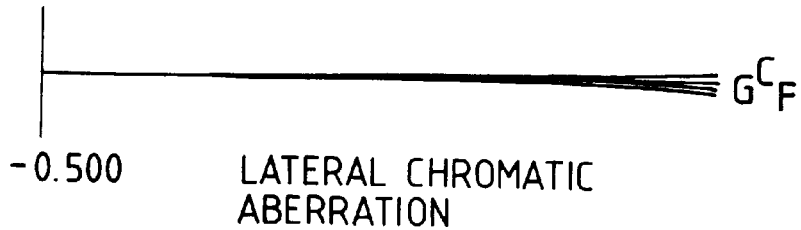

TRANSVERSE ABERRATION
A=-76.89

A=-54.49

A=-34.99

A=-17.25

RAND
-0.500

ALL COMA

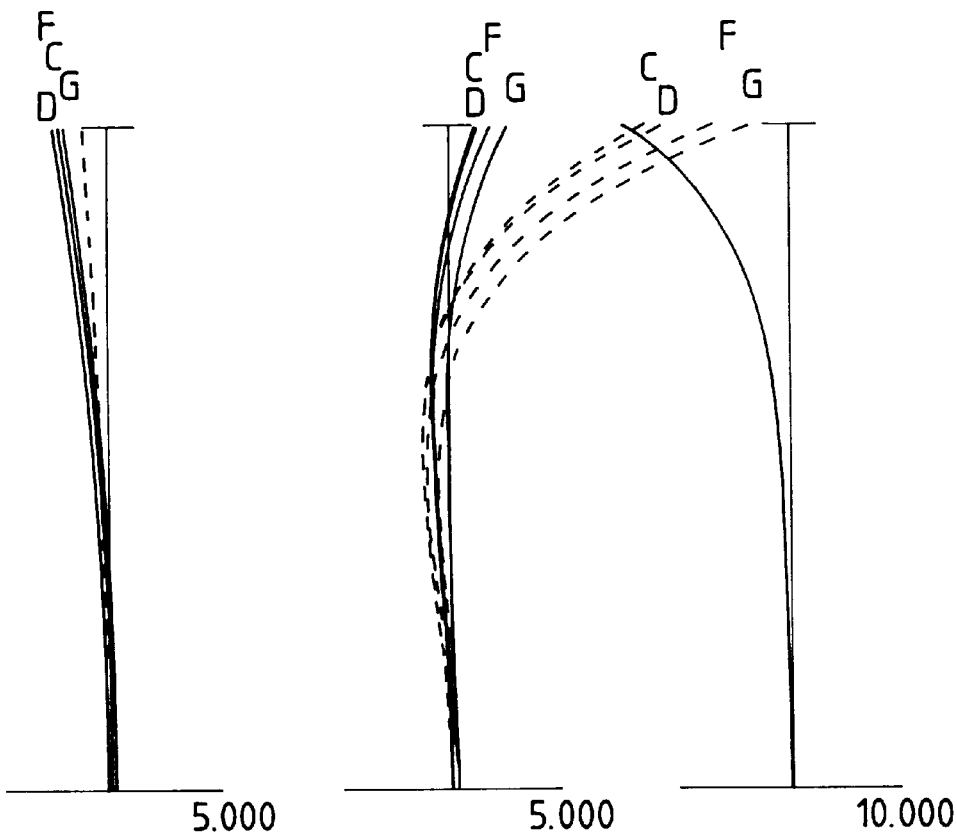
FIG. 14A
SPHERICAL ABERRATION
FNO=8.25
FIG. 14B
ASTIGMATISM
Y=110.00
FIG. 14C
DISTORTION
Y=110.00
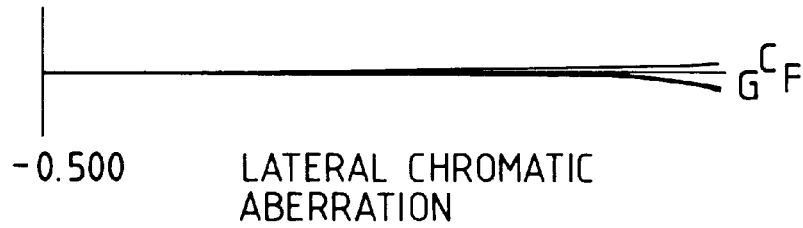
FIG. 14D      LATERAL CHROMATIC ABERRATION

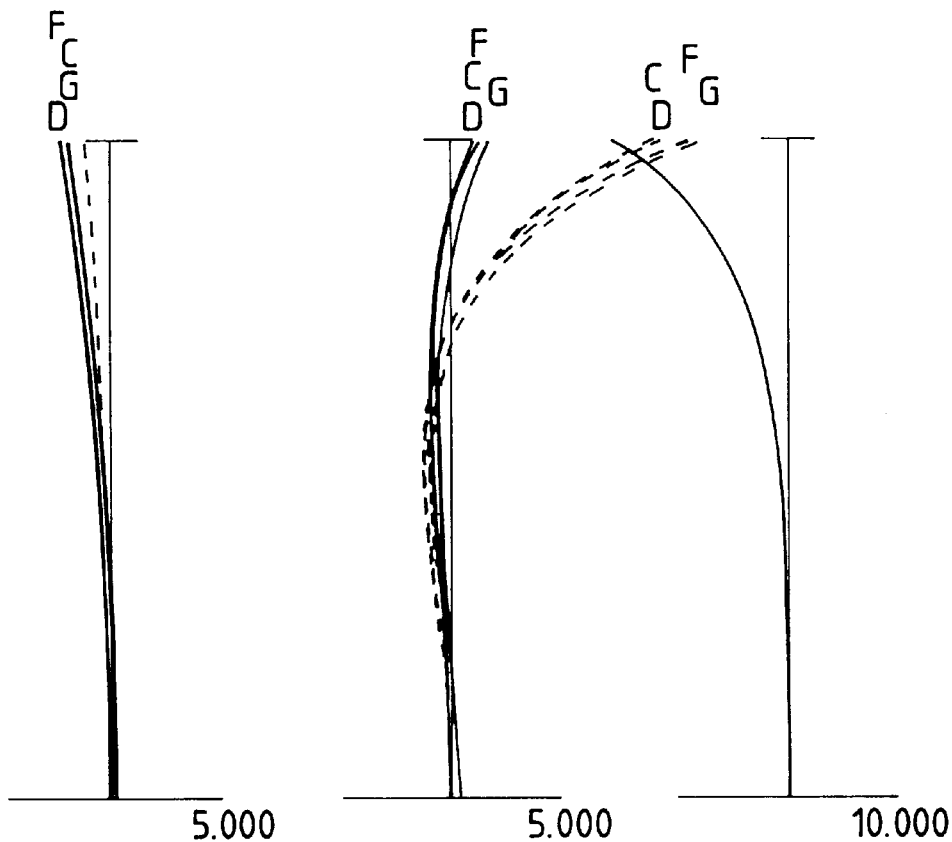
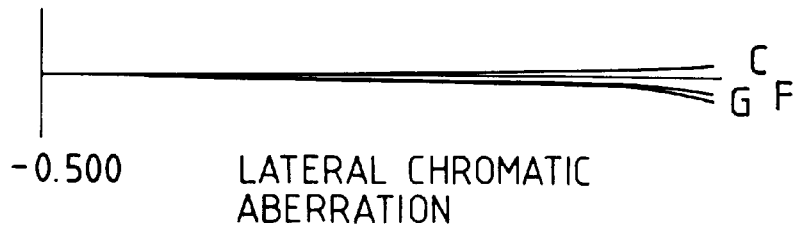

TRANSVERSE ABERRATION

A=-82.02

A=-50.78

A=-32.28

A=-15.84

RAND
-0.500

ALL COMA

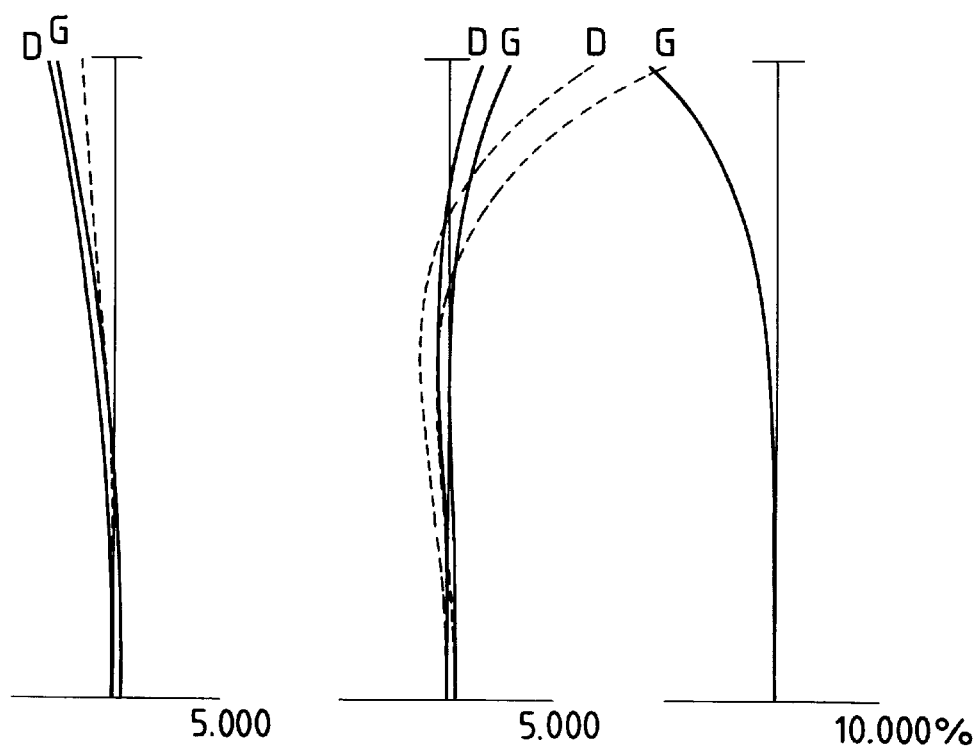
FIG. 18A SPHERICAL ABERRATION FNO=8.15
FIG. 18B ASTIGMATISM A=-77.35
FIG. 18C DISTORTION A=-77.35
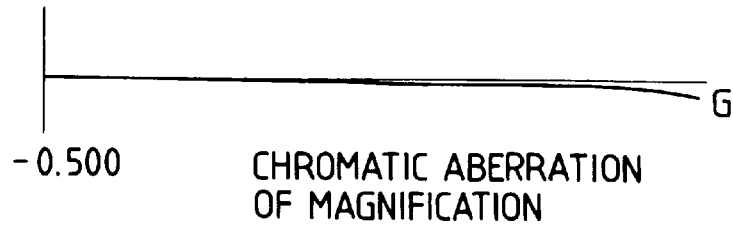
FIG. 18D CHROMATIC ABERRATION OF MAGNIFICATION

COMA

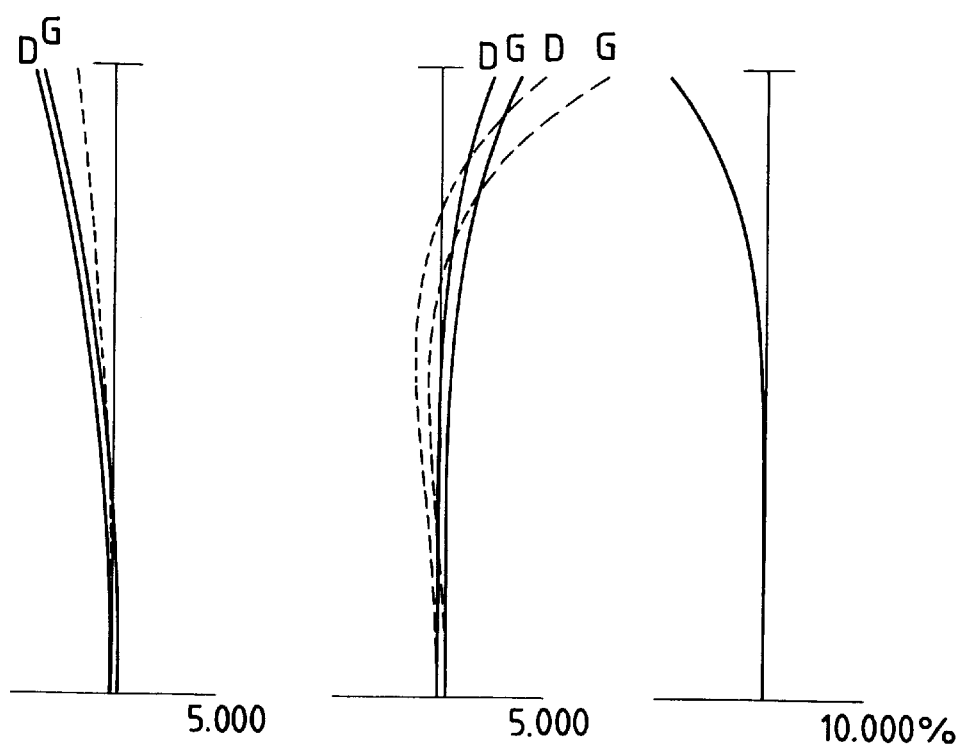
FIG. 20A
SPHERICAL ABERRATION
FNO= 8.13
FIG. 20B
ASTIGMATISM
A= -74.66
FIG. 20C
DISTORTION
A= -74.66
FIG. 20D
CHROMATIC ABERRATION
OF MAGNIFICATION

COMA
A=-74.66

A=-49.76

A=-32.05

A=-15.81

A=0.0
0.500

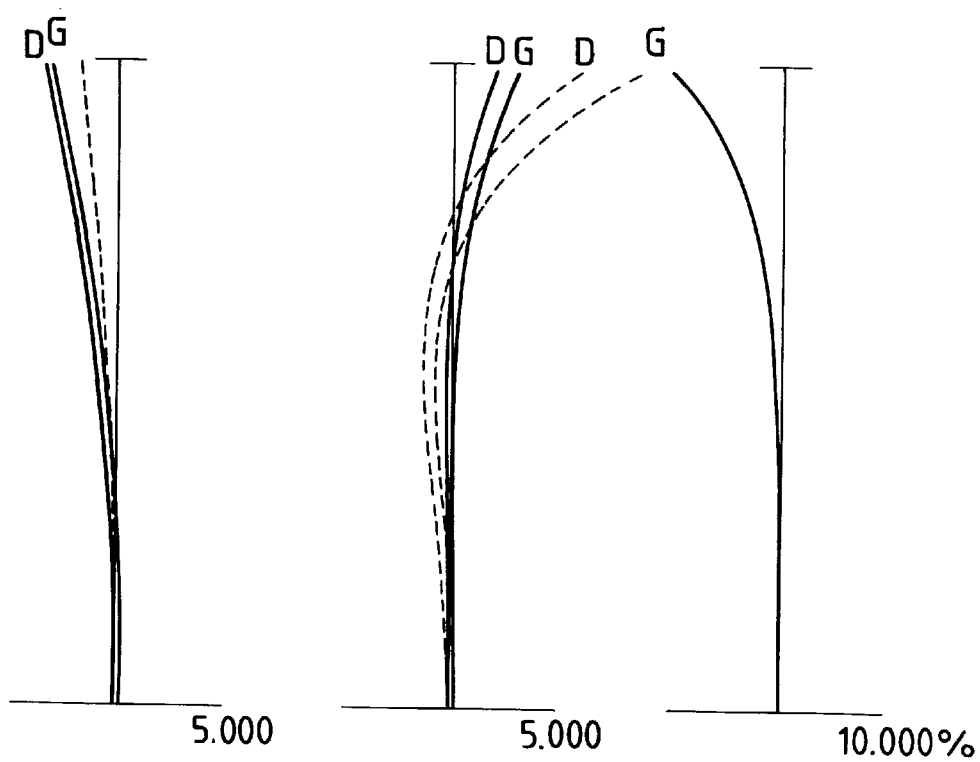
FIG. 22A
SPHERICAL ABERRATION
FNO=8.15
FIG. 22B
ASTIGMATISM
A=-75.72
FIG. 22C
DISTORTION
A=-75.72
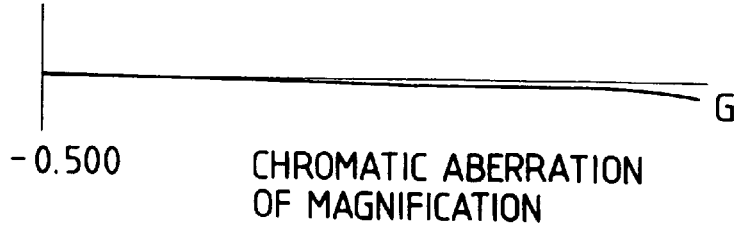
FIG. 22D
CHROMATIC ABERRATION
OF MAGNIFICATION

COMA

A=-75.72

A=-49.95

A=-32.10

A=-15.82

A=0.0
0.500

WIDE ANGLE LENS

This is a Continuation-In-Part of U.S. patent application Ser. No. 08/658,460 filed Jun. 5, 1996.

BACKGROUND OF THE INVENTION

1. Field of the Invention

The present invention relates generally to a super-wide angle lens, particularly to a super-wide angle lens having a field angle of 140° or larger, and more particularly to a so-called fisheye lens having a large barrel-shape distortion.

2. Related Background Art

A fisheye lens is used widely as a photographing lens because of exhibiting a peculiar delineation owing to a wide field angle and a large distortion. Further, the fisheye lens is broadly employed as a monitoring lens and a lens for a scientific research by utilizing the wide field angle thereof.

This type of known conventional fisheye lens is disclosed in, e.g., Japanese Patent Publication No. 49-20534.

The prior art fisheye lens disclosed in the above Publication includes, however, eight or more pieces of lens elements. As a result, the conventional super-wide angle lens has such disadvantages that the configuration thereof is comparatively complicated, and the lens is expensive.

SUMMARY OF THE INVENTION

It is a primary object of the present invention to provide an inexpensive super-wide angle lens capable of requiring a small number of lens elements, having a large field angle, and well correcting various aberrations excluding a distortion.

To accomplish this object, according to a first aspect of the present invention, a super-wide angle lens comprises, sequentially from an object side, a first negative lens L1, a second negative lens L2, and a third positive lens L3. The first negative lens L1 with its concave surface toward an image side has an image-side surface with a curvature larger than that on an object-side surface. The second negative lens L2 is disposed at a predetermined spacing from the first negative lens L1 and takes a negative meniscus shape with its convex surface toward the object side. The third positive lens L3 has its convex surface toward the object side.

According to a preferable mode in the first aspect of the present invention, the second negative lens L2 and the third positive lens L3 are combined to constitute a cemented lens. More preferably, the super-wide angle lens satisfies the following conditions:

$$0.8 < |f1|/f < 2.0$$

$$0.7 < |f1|/f23 < 1.3$$

where f1 is the focal length of the first negative lens L1, f23 is the synthesized focal length of the second negative lens L2 and the third positive lens L3, and f is the focal length of the whole lens system.

According to another aspect of the present invention, a super-wide angle lens comprises at least, sequentially from an object side, a first negative lens L1, a second negative lens L2, and a third positive lens L3. The first negative lens L1 with its concave surface toward an image side has an image-side surface with a curvature larger than that on an object-side surface. The second negative lens L2 is disposed at a predetermined spacing from the first negative lens L1 and takes a negative meniscus shape with its convex surface toward the object side. The third positive lens L3 has its convex surface toward the object side. The super-wide angle lens satisfies the following conditions:

$$0.4 < d3/f < 1.0$$

$$0.7 < r3/f < 1.4$$

$$0.3 < r4/f < 0.9$$

where r3 is the radius of curvature of the object-side surface of the second negative lens L2, r4 is the radius of curvature of the image-side surface of the second negative lens, d3 is the on-axis thickness of the second negative lens L2, and f is the focal length of the whole lens system.

According to a preferable mode in the second aspect of the present invention, the second negative lens L2 and the third positive lens L3 are combined to constitute a cemented lens. More preferably, the super-wide angle lens satisfies the following conditions:

$$0.08 < n2 - n3$$

$$4 < v2 \cdot v3 \cdot (n2-n3)/(v3-v2) < 12$$

where n2 is the refractive index of the second negative lens L2 with respect to the d-line, v2 is the Abbe's number of the second negative lens L2, n3 is the refractive index of the third positive lens L3 with respect to the d-line, and v3 is the Abbe's number of the third positive lens L3.

According to a third aspect of the present invention, a super-wide angle lens comprises, sequentially from an object side, a first lens L1 having a negative refracting power, a second lens L2 having a negative refracting power and a third lens L3 having a positive refracting power. The first lens L1 includes its concave surface toward an image-side and has a larger curvature on an image-side surface than on an object-side surface. The second lens L2 is disposed at a predetermined spacing from the first lens L1, and takes a meniscus shape with its convex surface toward the object side. The third lens L3 has its convex surface toward the object side. The second lens L2 and the third lens L3 are combined to constitute a cemented positive lens element L23 having a positive refracting power as a whole. The super-wide angle lens satisfies the following condition:

$$0.5 < v2r3/(v1r2) < 0.8$$

where r2 is the radius of curvature of the image-side surface of the first lens L1, r3 is the radius of curvature of the object-side surface of the second lens L2, v1 is the Abbe's number of the first lens L1, and v2 is the Abbe's number of the second lens L2.

According to a preferable mode in the third aspect of the present invention, the super-side angle lens satisfies the following condition:

$$4.6 < v3r3/(v2r4) < 5.05$$

where r3 is the radius of curvature of the object-side surface of the second lens L2, r4 is the radius of curvature of the image-side surface of the second lens L2, v2 is the Abbe'number of the second lens L2, and v3 is the Abbe's number of the third lens L3.

The above and other objects, features and advantages of the present invention will be explained hereinafter and may be better understood by reference to the drawings and the descriptive matter which follows.

BRIEF DESCRIPTION OF THE DRAWINGS

FIGS. 2A, 2B, 2C, 2D, 2E, 2F, 2G, 2H, 2I and 2J are diagrams showing a variety of aberrations in the first embodiment;

FIG. 3 is a view illustrating a configuration of the super-wide angle lens in a second embodiment of the present invention;

FIGS. 4A, 4B, 4C, 4D, 4E, 4F, 4G, 4H, 4I and 4J are diagrams showing a variety of aberrations in the second embodiment;

FIG. 5 is a view illustrating a configuration of the super-wide angle lens in a third embodiment of the present invention;

FIGS. 6A, 6B, 6C, 6D, 6E, 6F, 6G, 6H, 6I and 6J are diagrams showing a variety of aberrations in the third embodiment;

FIGS. 8A, 8B, 8C, 8D, 8E, 8F, 8G, 8H, 8I and 8J are diagrams showing a variety of aberrations in the fourth embodiment;

FIGS. 10A, 10B, 10C, 10D, 10E, 10F, 10G, 10H, 10I and 10J are diagrams showing a variety of aberrations in the fifth embodiment;

FIGS. 12A, 12B, 12C, 12D, 12E, 12F, 12G, 12H, 12I and 12J are diagrams showing a variety of aberrations in the sixth embodiment;

FIGS. 14A, 14B, 14C, 14D, 14E, 14F, 14G, 14H, 14I and 14J are diagrams showing a variety of aberrations in the seventh embodiment;

FIGS. 16A, 16B, 16C, 16D, 16E, 16F, 16G, 16H, 16I and 16J are diagrams showing a variety of aberrations in the eighth embodiment of the present invention;

FIGS. 18A, 18B, 18C, 18D, 18E, 18F, 18G, 18H and 18I are diagrams showing a variety of aberrations in the ninth embodiment;

FIGS. 20A, 20B, 20C, 20D, 20E, 20F, 20G, 20H and 20I are diagrams showing a variety of aberrations in the tenth embodiment;

FIGS. 22A, 22B, 22C, 22D, 22E, 22F, 22G, 22H and 22I are diagrams showing a variety of aberrations in the eleventh embodiment.

DETAILED DESCRIPTION OF THE PREFERRED EMBODIMENTS

Figure 1:
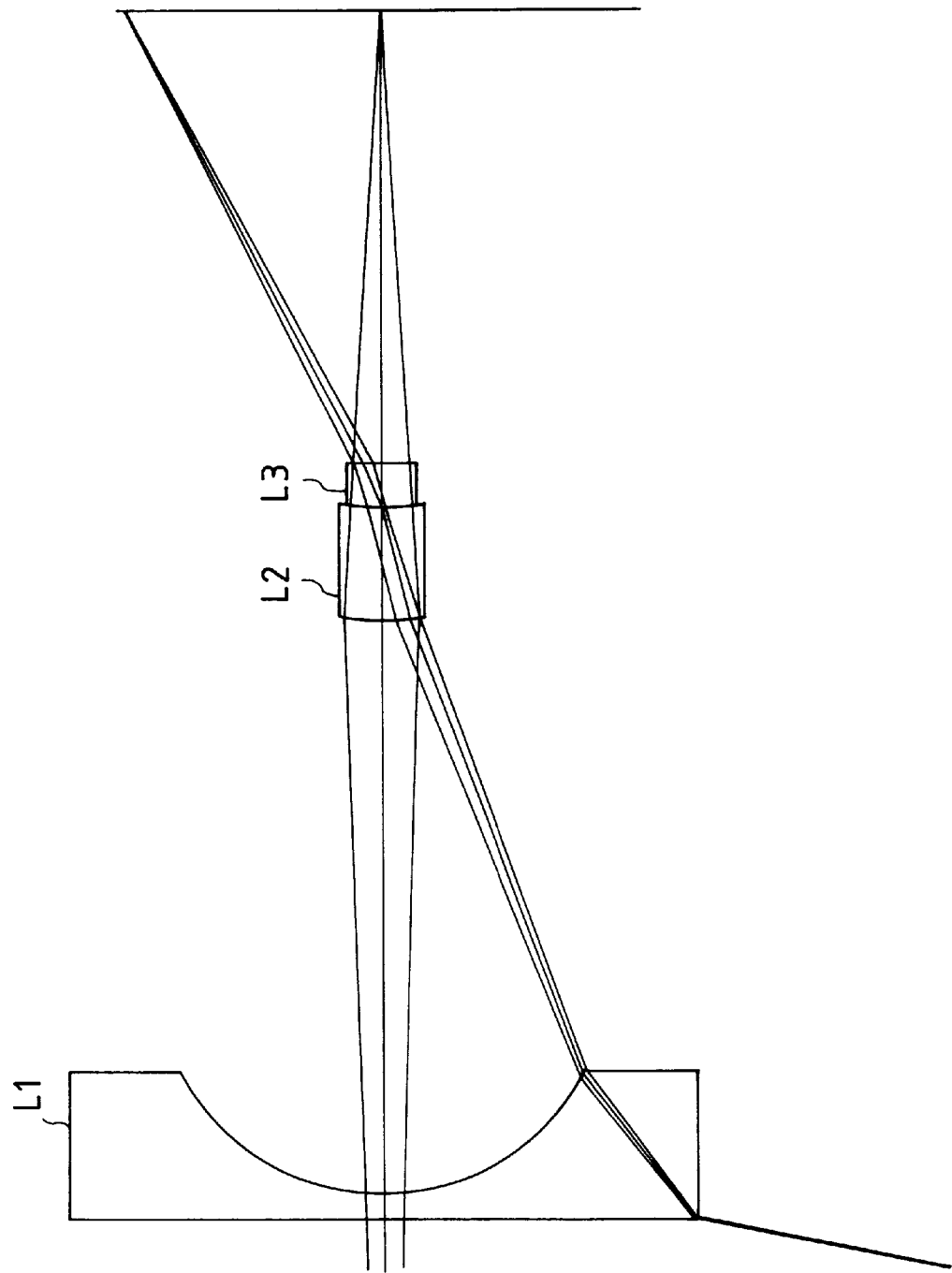
FIG. 1 is a view illustrating a configuration of a super-wide angle lens in a first embodiment of the present invention.
Figure 2E:
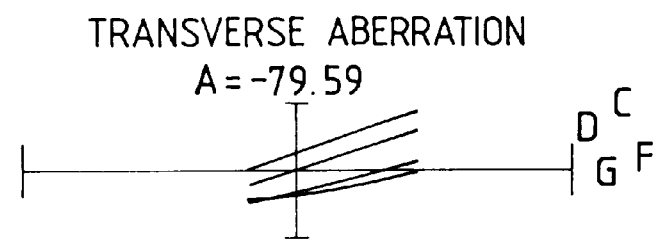
Figure 2F:
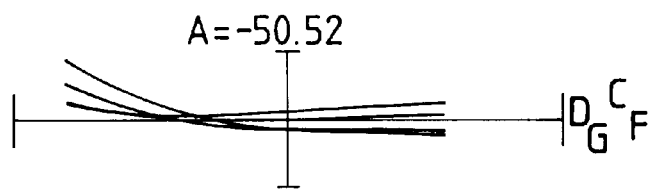
Figure 2G:
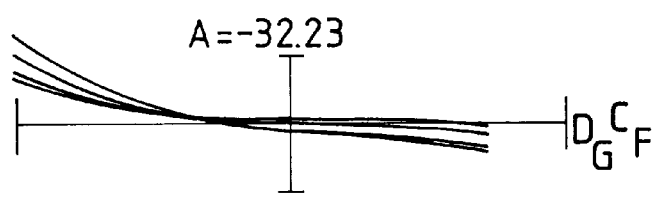
Figure 2H:
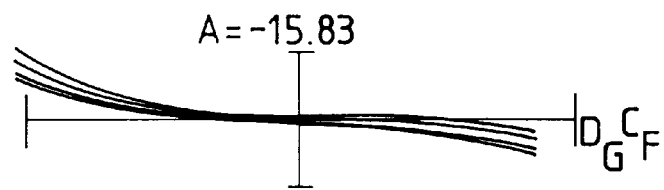
Figure 2I:
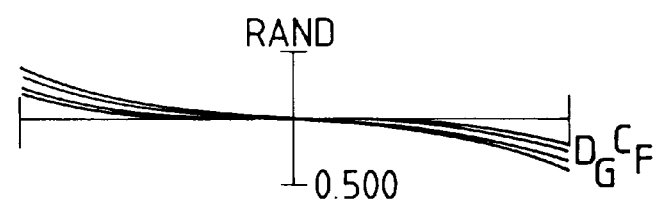
Figure 2J:
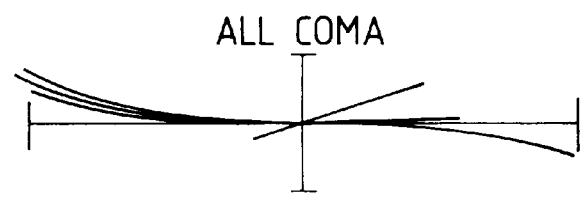
Figures 4A, 4B, 4C:
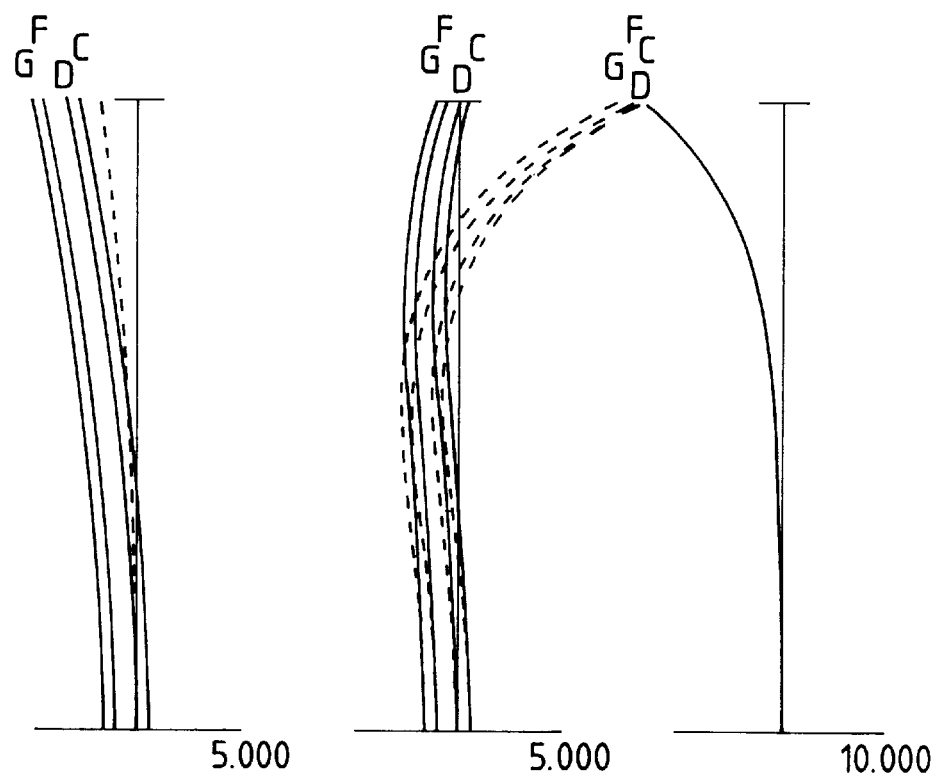
Figure 4D:
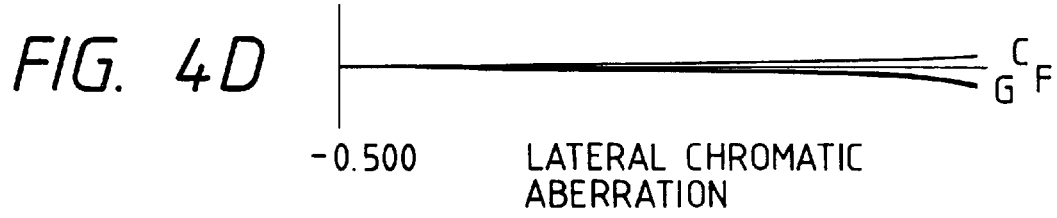
Figure 6E:
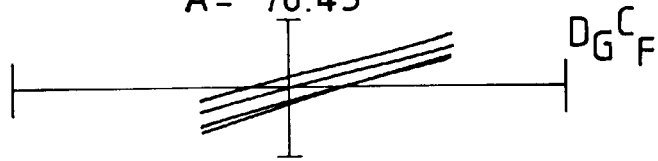
Figure 6F:
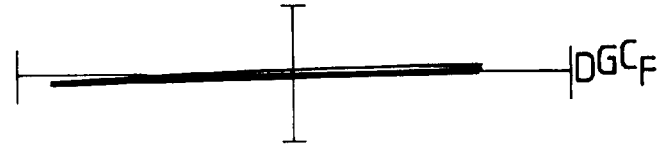
Figure 6G:
Figure 6H:
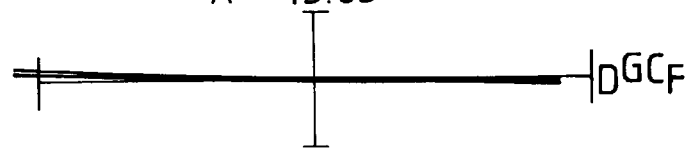
Figure 6I:
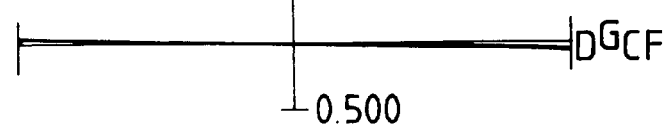
Figure 6J:

The super-wide angle lens according to the first aspect of the present invention has, as illustrated in FIG. 1, sequentially from the object-side, the first negative lens L1, the second negative lens L2 and the third positive lens L3. Then, the first negative lens L1 with its concave surface toward the image side has the curvature larger on the image-side surface than that on the object-side surface. Further, the second negative lens L2 is disposed at the predetermined spacing from the first negative lens L1 and takes the negative meniscus shape with its convex surface toward the convex surface. Moreover, the third positive lens L3 has its convex surface toward the object side.

More specifically, the first negative lens L1 assumes the plano-concave shape with its substantially plane surface toward the object side. Then, the first negative lens L1 functions to produce a large negative distortion, convert a light flux incident at a large angle of incidence into a light flux emerging at a predetermined small angle, and guide the light flux to the second negative lens L2.

Further, the second negative lens L2 is disposed between the first negative lens L1 exhibiting an action of divergence and the third positive lens L3 exhibiting an action of forming an image. Then, the second negative lens L2 functions as an aberration correcting positive lens for correcting the various aberrations caused in the first negative lens L1 and the second negative lens L2.

Furthermore, the third positive lens L3 is a sole positive lens in the whole lens system. Then, the third positive lens L3 functions as an image forming lens for forming, on a predetermined image surface, an image of the light from a virtual image formed by the first negative lens L1 and the second negative lens L2.

The super-wide angle lens according to the present invention is basically constructed of the above-mentioned three lens elements L1 to L3. Then, the super-wide angle lens is characterized by such a construction that the second negative lens L2 taking the negative meniscus shape is disposed as the aberration correcting lens between the first negative lens L1 serving as the diverging lens and the third positive lens L3 serving as the image forming lens.

The following is a detailed description of the operation of the second negative lens L2 as the aberration correcting lens.

To start with, if a system with the second negative lens L2 removed is assumed in the super-wide angle lens of the present invention, it might be expected that there remarkably increase a magnification chromatic aberration attributed to the diverging action of the first negative lens L1, an on-axis chromatic aberration and a negative spherical surface aberration that are derived from the image forming action of the third positive lens L3. Then, as illustrated in FIG. 1, the second negative lens L2 as the thick negative meniscus lens with its convex surface toward the object side is interposed between the first negative lens L1 and the third positive lens L3, whereby the divergence of the second negative lens L2 is larger that the divergences of the first negative lens L1 and the third positive lens L3.

Thus, the magnification chromatic aberration attributed to the first negative lens L1 can be offset by the converging action of the object-side surface of the second negative lens L2. Further, the negative spherical aberration and the on-axis chromatic aberration that are caused by the third positive lens L3 can be well corrected by the large diverging action of the image-side surface of the second negative lens L2.

Therefore, it is desirable that an on-axis thickness of the second negative lens L2 be larger than an on-axis thickness of the third positive lens.

Further, it is desirable in the super-wide angle lens of the present invention that the cemented lens be composed of the second negative lens L2 and the third positive lens L3 to facilitate the working and the assemble as well.

Next, a conditional formula of the present invention will be explained.

The super-wide angle lens in the first aspect of the present invention preferably satisfies the following conditions:

$$0.8 < |f1|/f < 2.0 \quad (1)$$

$$0.7 < |f1|/f23 < 1.3 \quad (2)$$

where f1: the focal length of the first negative lens L1, f23: the synthesized focal length of the second negative lens L2 and the third positive lens L3, and f: the focal length of the whole lens system.

The conditional formulae (1) and (2) are fundamental conditions for correcting the various aberrations well with the construction using the only three lens elements.

If over an upper limit value of the conditional formula (1), the refracting power of the first negative lens L1 becomes too weak to obtain the predetermined large field angle. Alternatively, this induces a scale-up of the whole lens system with an increased spacing from the second negative lens L2.

Whereas if under a lower limit value of the conditional formula (1), the refracting power of the first negative lens L1 excessively increases, with the result that the various aberrations are hard to correct.

If over an upper limit value of the conditional formula (2), the synthetic refracting power of the second negative lens L2 and the third positive lens L3 that constitute a rear lens group becomes too strong to secure a predetermined back-focal distance. Further, a Petzval's sum increases on the positive side enough not to keep the planarity of the image surface.

Whereas if under a lower limit value of the conditional formula (2), the synthetic refracting power of the second negative lens L2 and the third positive lens L3 becomes too weak, with the result that not only the whole lens system increases in size, but also the Petzval's sum increases on the negative side enough not to keep the planarity of the image surface.

Further, according to the second aspect of the present invention, a super-wide angle lens, sequentially from an object side, comprises at least a first negative lens L1, a second negative lens L2 and a third positive lens L3. Then, the first negative lens L1 with its concave surface toward an image side has an image-side surface with a curvature larger than that on an object-side surface. The second negative lens L2 is disposed at a predetermined spacing from the first negative lens L1 and takes a negative meniscus shape with its convex surface toward the object side. The third positive lens L3 has its convex surface toward the object side.

Further, according to the second aspect of the present invention, the super-wide angle lens satisfies the following conditions:

$$0.4 < d3/f < 1.0 \quad (3)$$

$$0.7 < r3/f < 1.4 \quad (4)$$

$$0.3 < r4/f < 0.9 \quad (5)$$

where r3: the radius of curvature of the object-side surface of the second negative lens L2, r4: the radius of curvature of the image-side surface of the second negative lens, d3: the on-axis thickness of the second negative lens L2, and f: the focal length of the whole lens system.

Note that the on-axis thickness of the second negative lens L2 is a distance along the optical axis between the object-side surface of the second negative lens L2 and the image-side surface thereof.

The conditional formula (3) prescribes a proper range relative to the on-axis thickness of the second negative lens L2 defined as the aberration correcting lens.

As discussed above, the object-side surface of the image-side surface of the second negative lens L2 have functions different from each other in terms of correcting the aberrations. Namely, a qualitative concept is that the object-side surface functions to correct an off-axis aberration, while the image-side surface functions to correct the on-axis aberration.

Hence, if under a lower limit value of the conditional formula (3), the on-axis thickness of the second negative lens L2 is too small, and hence there is an insufficient separation between the function of the object-side surface and the function of the image-side surface. As a result, it may happen that the off-axis aberrations, especially an inward comatic aberration and the magnification chromatic aberration fail to be corrected.

Whereas if over an upper limit value of the conditional formula (3), the scale-up of the whole lens system is brought about. Besides, a balance between the on-axis aberration and the off-axis aberration is lost, and the on-axis chromatic aberration and an outward comatic aberration are hard to correct. Further, undesirably a bend of the image surface increases.

The conditional formula (4) is a condition for correcting the off-axis aberration well in such a state that the conditional formula (3) is satisfied.

If over an upper limit value of the conditional formula (4), the image surface is bent on the negative side, and it is therefore impossible to maintain the planarity of the image surface.

Whereas if under a lower limit value of the conditional formula (4), the image surface is bent on the positive side, it is also therefore impossible to keep the planarity of the image surface.

The conditional formula (5) is a condition for correcting the on-axis aberration well in such a state that the conditional formulae (3) and (4) are met.

If over an upper limit value of the conditional formula (5), the on-axis aberrations including the chromatic aberration remain on the negative side, resulting in a deterioration of the on-axis performance.

Whereas if under a lower limit value of the conditional formula (5), the on-axis aberration is excessively corrected, resulting in the deteriorated on-axis performance.

Further, according to the second aspect of the present invention, it is desirable the following conditions (6) and (7) be satisfied.

$$0.08 < n2 - n3 \quad (6)$$

$$4 < v2 \cdot v3 \cdot (n2 - n3)/(v3 - v2) < 12 \quad (7)$$

where n2: the refractive index of the second negative lens L2 with respect to the d-line, ν2: the Abbe's number of the second negative lens L2, n3: the refractive index of the third positive lens L3 with respect to the d-line, and ν3: the Abbe's number of the third positive lens L3.

The conditional formulae (6) and (7) are conditions relative to an optimal combination of optical materials of the second negative lens L2 and the third positive lens L3. The conditional formula (6) is a condition serving as a premise of the conditional formula (7).

If under a lower limit value of the conditional formula (6), the on-axis aberration can not be corrected unless the curvature of the image-side surface of the second negative lens L2 remarkably increases. In consequence, it follows that the on-axis aberration remains largely on the negative side, or a high-order comatic aberration is produced.

The conditional formula (7) prescribes the combination of the optical materials of the second negative lens L2 and the third positive lens L3.

If over an upper limit value of the conditional formula (7), the divergence of the second negative lens L2 becomes relatively small, and undesirably a lack of correction of the on-axis chromatic aberration is caused.

Whereas if under a lower limit value of the conditional formula (7), the divergence of the second negative lens L2 becomes too large, and undesirably an excessive correction of the on-axis chromatic aberration is brought about.

Incidentally, it is also desirable in the super-wide angle lens in the second aspect of the present invention that the above-mentioned conditional formulae (1) and (2) be satisfied.

Further, according to the present invention, it is desirable that the following conditional formulae (8) and (9) be met.

$$45 < \nu1 \qquad (8)$$

$$-0.06 < r2/r1 < 0.06 \qquad (9)$$

where

ν1: the Abbe's number of the first negative lens L1, r1: the radius of curvature of the object-side surface of the first negative lens L1, and r2: the radius of curvature of the image-side surface of the first negative lens L1.

The conditional formula (8) prescribes a condition for correcting the magnification chromatic aberration well.

If under a lower limit value of the conditional formula (8), it becomes difficult to correct the negative magnification chromatic aberration caused by the first negative lens L1.

The conditional formula (9) prescribes a configuration of the first negative lens L1.

If under a lower limit value of the conditional formula (9), the curvature of the object-side surface of the first negative lens L1 becomes too large, and it is therefore impossible to widen the angle.

Whereas if above an upper limit value of the conditional formula (9), the curvature of the image-side surface of the first negative lens L1 becomes too large, resulting in a difficulty of working this surface. In this connection, as a matter of course, both the working and correction of the off-axis aberration become easier with a smaller curvature of the image-side surface of the first negative lens L1. Accordingly, the state becomes better with a higher refractive index of the first negative lens L1. It is desirable that the refractive index with respect to, e.g., the d-line be 1.58 or greater.

The super-side angle lens according to the third aspect of the present invention comprises, sequentially from the object side, the first lens L1 having the negative refracting power, the second lens L2 having the negative refracting power and the third lens L3 having the positive refracting power. Then, the first lens L1 includes its concave surface toward the image side and has the larger curvature on the image-side surface than on the object-side surface. Further, the second lens L2 is disposed at the predetermined spacing from the first lens L1, and takes the meniscus shape with its convex surface toward the object side. Moreover, the third lens L3 has its convex surface toward the object side. Note that the second lens L2 and the third lens L3 are combined to constitute the cemented positive lens element L23 having the positive refracting power as a whole.

The super-wide angle lens according to the third aspect of the present invention satisfies the following condition (10)

$$0.5 < \nu2 r3/(\nu1 r2) < 0.8 \qquad (10)$$

where r2: the radius of curvature of the image-side surface of the first lens L1, r3: the radius of curvature of the object-side surface of the second lens L2, ν1: the Abbe's number of the first lens L1, and ν2: the Abbe's number of the second lens L2.

The conditional formula (10) relates to a magnification chromatic aberration as the most vital aberration to be corrected in the super-side angle lens.

A case of being over an upper limit value in the conditional formula (10) happens if a dispersion of the second lens L2 is too small or if the curvature of the object-side surface of the second lens L2 is too small. In this case, a negative magnification chromatic aberration caused in the first lens L1 remains deficient of correction.

Reversely, a case of being under a lower limit value in the conditional formula (10) happens if the dispersion of the second lens L2 is too large as compared with the dispersion of the first lens L1 or if the curvature of the object-side surface of the second lens L2 is too large. In this case, the negative magnification chromatic aberration caused in the first lens L1 is excessively corrected by the second lens L2.

Further, according to the third aspect of the present invention, it is desirable that the super-wide angle lens satisfies the conditional formula (11):

$$4.6 < \nu3 r3/(\nu2 r4) < 5.05 \qquad (11)$$

where r4: the radius of curvature of the image-side surface of the second lens L2, and ν3: the Abbe's number of the third lens L3.

The conditional formula (11) is given for well correcting the on-axis chromatic aberration simultaneously in a state where the conditional formula (10) is satisfied.

If over the upper limit value of the conditional formula (11), undesirably a lack of correction of the on-axis chromatic aberration is caused.

Whereas if under the lower limit value of the conditional formula (11), undesirably an excessive correction of the on-axis chromatic aberration is brought about.

In accordance with each embodiment, a super-wide angle lens according to the present invention is constructed of, sequentially from an object side, a first negative lens L1, a second negative lens L2 and a third positive lens L3. Then, the first negative lens L1 takes a plano-concave shape with its concave surface toward an image side. Further, the second negative lens L2 is disposed at a predetermined air spacing from the first negative lens L1 and assumes a thick negative meniscus shape with a convex surface toward the object side. Moreover, the third positive lens L3 takes a biconvex shape thinner than the second negative lens L2.

Note that the second negative lens L2 and the third positive lens L3 are combined to constitute a cemented positive lens in each embodiment. Further, although no aperture stop is provided in each embodiment, the aperture stop can be provided just posterior to, e.g., the third positive lens L3 on the image side.

The respective embodiments of the present invention will hereinafter be described with reference to the accompanying drawings.

First Embodiment

FIG. 1 is a view illustrating a configuration of a super-wide angle lens in accordance with a first embodiment of the present invention.

The super-wide angle lens shown in FIG. 1 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 1 shows values of various items in the first embodiment of the present invention. In Table 1, f designates a focal length of a whole lens system, FNO represents an F-number, 2ω denotes a field angle, and Bf represents a back-focal distance, respectively. Further, the numerals at the left end show the order of respective lens surfaces from the object side, r is a radius of curvature of each lens surface, d is a spacing between the respective lens surfaces, n is a refractive index with respect to the d-line (λ=587.6 nm), and ν is an Abbe's number, respectively.

TABLE 1 f = 100.000
Bf = 197.553
FNO = 8.25
2ω = 159.2°

| | r | d | n | ν |
|---|---|---|---|---|
| 1 | ∞ | 10.0017 | 1.62041 | 60.14 |
| 2 | 101.0675 | 250.0434 | | |
| 3 | 89.2665 | 50.0087 | 1.86074 | 23.01 |
| 4 | 53.0192 | 20.0035 | 1.51860 | 69.98 |
| 5 | −209.9565 | 197.5528 | | |

(Condition corresponding values)

(1) |f1|/f = 1.629
(2) |f1|/f23 = 1.064
(3) d3/f = 0.500
(4) r3/f = 0.893
(5) r4/f = 0.530
(6) n2 − n3 = 0.342
(7) ν2 · ν3 · (n2 − n3)/(ν3 − ν2) = 11.73
(8) ν1 = 60.1
(9) r2/r1 = 0.0

FIGS. 2A to 2J are diagrams showing a variety of aberrations in the first embodiment.

Referring to the diagram showing the respective aberrations, FNO designates the F-number, Y represents a height of image, A denotes a semi-field angle, D shows a d-line (λ=587.6 nm), G indicates a g-line (λ=435.8 nm), C indicates a C-line (λ=656.3 nm), and F represents an F-line (λ=486.1 nm), respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (η/2).

As obvious from the diagrams each showing the aberration, it can be understood that the variety of aberrations are well corrected in this embodiment.

Second Embodiment

FIG. 3 is a view illustrating a configuration of the super-wide angle lens in accordance with a second embodiment of the present invention.

The super-wide angle lens shown in FIG. 3 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 2 shows values of various items in the second embodiment of the present invention. In Table 2, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm), and ν is the Abbe's number, respectively.

TABLE 2 f = 100.000
Bf = 197.349
FNO = 8.23
2ω = 158.2°

| | r | d | n | ν |
|---|---|---|---|---|
| 1 | ∞ | 15.0285 | 1.62041 | 60.14 |
| 2 | 101.4156 | 250.4754 | | |
| 3 | 91.8393 | 52.5998 | 1.86074 | 23.01 |
| 4 | 50.4963 | 17.5333 | 1.58913 | 61.09 |
| 5 | −350.8209 | 197.3488 | | |

(Condition corresponding values)

(1) |f1|/f = 1.618
(2) |f1|/f23 = 1.061
(3) d3/f = 0.526
(4) r3/f = 0.918
(5) r4/f = 0.505
(6) n2 − n3 = 0.272
(7) ν2 · ν3 · (n2 − n3)/(ν3 − ν2) = 10.19
(8) ν1 = 60.1
(9) r2/r1 = 0.0

FIGS. 4A to 4J are diagrams showing the variety of aberrations in the second embodiment.

Referring to the diagram showing the respective aberrations, FNO designates the F-number, Y represents a height of image, A denotes a semi-field angle, D shows a d-line (λ=587.6 nm), G indicates a g-line (λ=435.8 nm), C indicates a C-line (λ=656.3 nm), and F represents an F-line (λ=486.1 nm), respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Third Embodiment

FIG. 5 is a view illustrating a configuration of the super-wide angle lens in accordance with a third embodiment of the present invention.

The super-wide angle lens shown in FIG. 5 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 3 shows values of various items in the third embodiment of the present invention. In Table 3, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line ($\lambda$=587.6 nm), and ν is the Abbe's number, respectively.

TABLE 3 f = 100.000
Bf = 197.875
FNO = 8.24
2ω = 156.9°

|   | r | d | n | ν |
|---|---|---|---|---|
| 1 | ∞ | 15.0285 | 1.67000 | 57.36 |
| 2 | 104.6411 | 255.4849 | | |
| 3 | 99.4287 | 65.1236 | 1.84666 | 23.88 |
| 4 | 37.0300 | 17.5333 | 1.72000 | 43.69 |
| 5 | −1371.4459 | 197.8753 | | |

(Condition corresponding values)

(1) |f1|/f = 1.562
(2) |f1|/f23 = 1.008
(3) d3/f = 0.651
(4) r3/f = 0.994
(5) r4/f = 0.370
(6) n2 − n3 = 0.127
(7) ν2 · ν3 · (n2 − n3)/(ν3 − ν2) = 6.67
(8) ν1 = 57.4
(9) r2/r1 = 0.0

FIGS. 6A to 6J are diagrams showing the variety of aberrations in the third embodiment.

Referring to the diagram showing the respective aberrations, FNO designates the F-number, Y represents a height of image, A denotes a semi-field angle, D shows a d-line ($\lambda$=587.6 nm, G indicates a g-line ($\lambda$=435.8 nm, C indicates a C-line ($\lambda$=656.3 nm, and F represents an F-line ($\lambda$=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Fourth Embodiment

Figure 7:
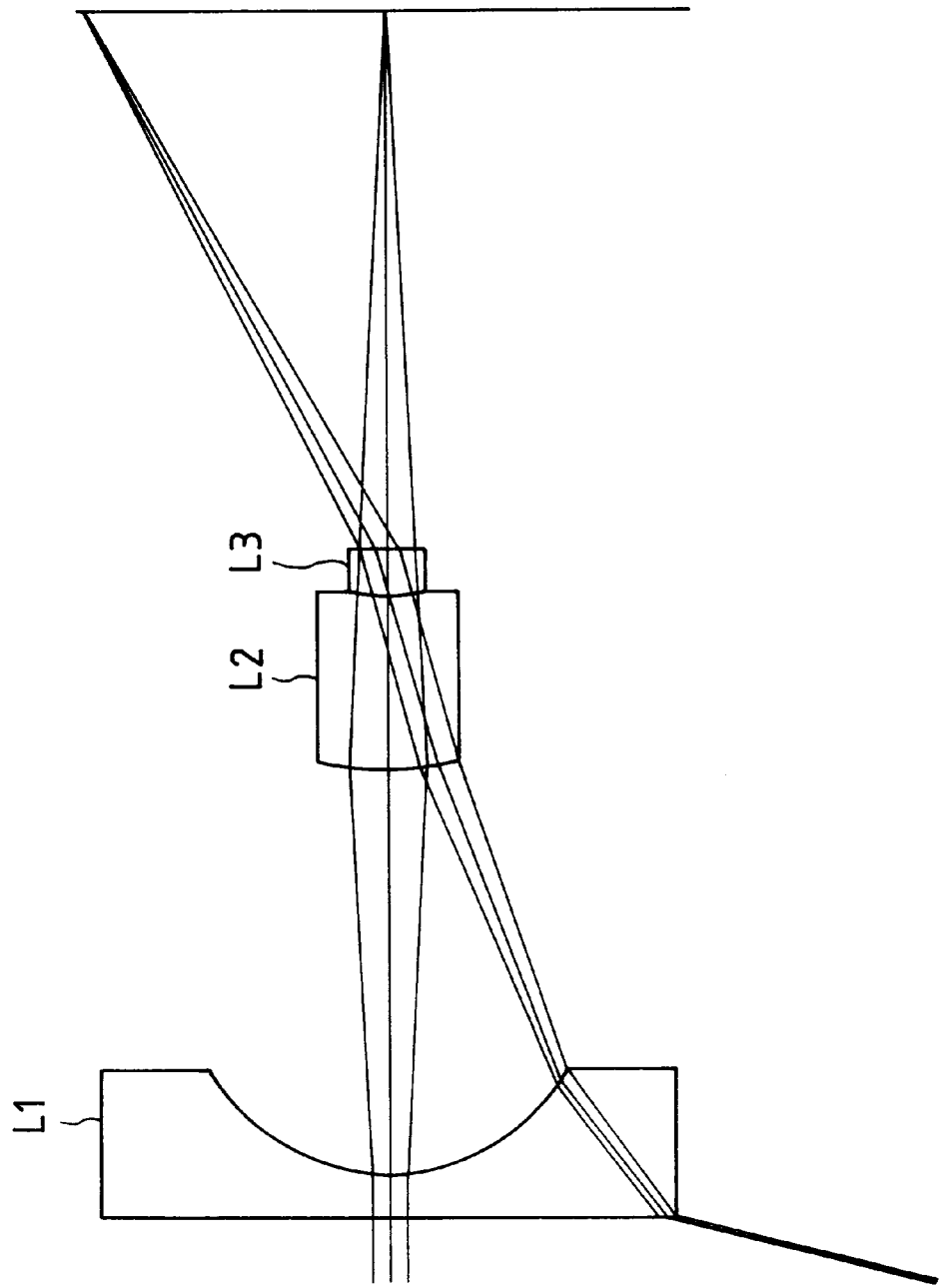
FIG. 7 is a view illustrating a configuration of the super-wide angle lens in a fourth embodiment of the present invention.
Figure 8E:
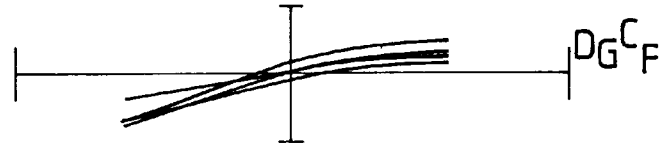
Figure 8F:
Figure 8G:
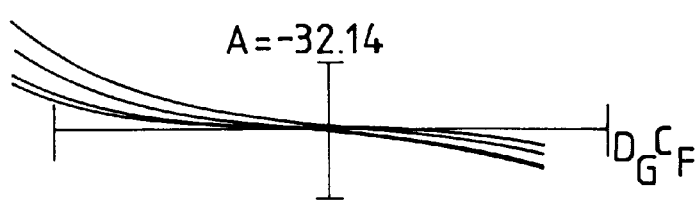
Figure 8H:
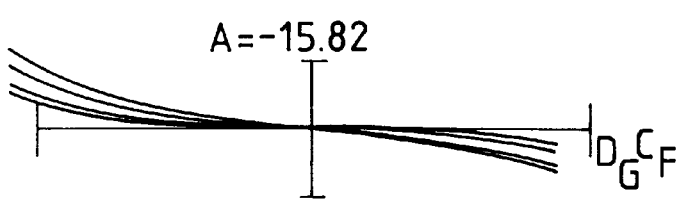
Figure 8I:
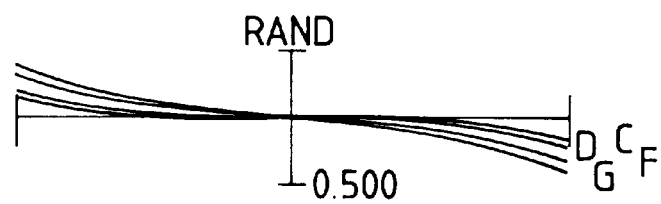
Figure 8J:
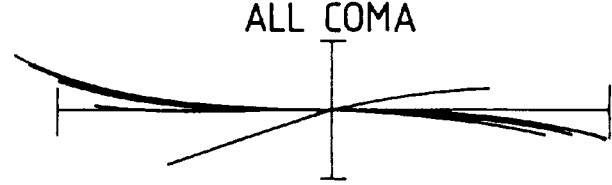

FIG. 7 is a view illustrating a configuration of the super-wide angle lens in accordance with a fourth embodiment of the present invention.

The super-wide angle lens shown in FIG. 7 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 4 shows values of various items in the fourth embodiment of the present invention. In Table 4, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line ($\lambda$=587.6 nm), and ν is the Abbe's number, respectively.

TABLE 4 f = 100.000
Bf = 197.870
FNO = 8.26
2ω = 153.8°

|   | r | d | n | ν |
|---|---|---|---|---|
| 1 | ∞ | 15.0285 | 1.62041 | 60.14 |
| 2 | 72.6269 | 150.2852 | | |
| 3 | 117.1811 | 65.1236 | 1.86074 | 23.01 |
| 4 | 71.9464 | 17.5333 | 1.62041 | 60.14 |
| 5 | −145.5654 | 197.8704 | | |

(Condition corresponding values)

(1) |f1|/f = 1.171
(2) |f1|/f23 = 0.914
(3) d3/f = 0.651
(4) r3/f = 1.172
(5) r4/f = 0.719
(6) n2 − n3 = 0.240
(7) ν2 · ν3 · (n2 − n3)/(ν3 − ν2) = 8.96
(8) ν1 = 60.1
(9) r2/r1 = 0.0

FIGS. 8A to 8J are diagrams showing the variety of aberrations in the fourth embodiment.

Referring to the diagram showing the respective aberrations, FNO designates the F-number, Y represents a height of image, A denotes a semi-field angle, D shows a d-line ($\lambda$=587.6 nm, G indicates a g-line ($\lambda$=435.8 nm, C indicates a C-line ($\lambda$=656.3 nm, and F represents an F-line ($\lambda$=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Fifth Embodiment

Figure 9:
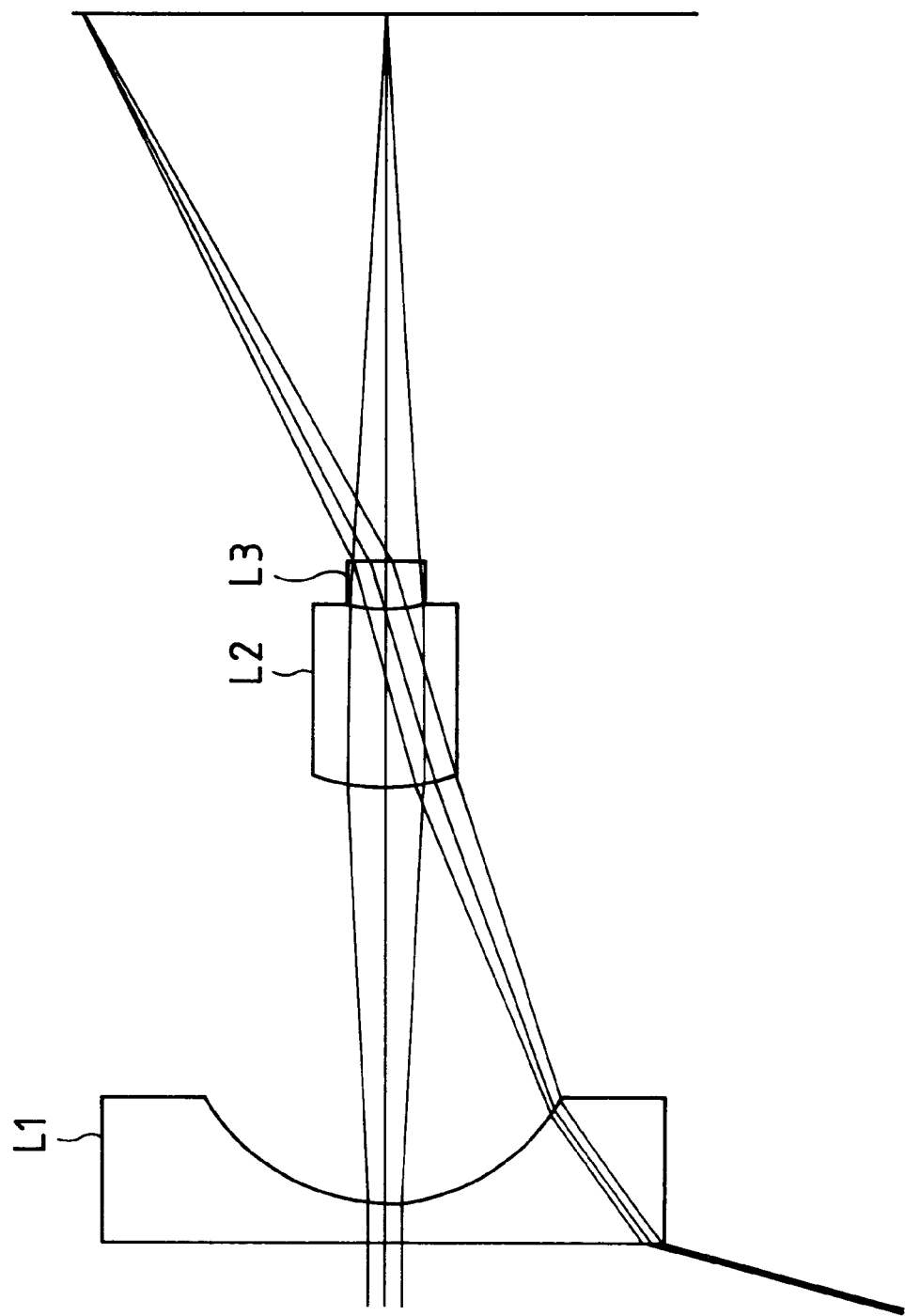
FIG. 9 is a view illustrating a configuration of a super-wide angle lens in a fifth embodiment of the present invention.
Figure 10E:
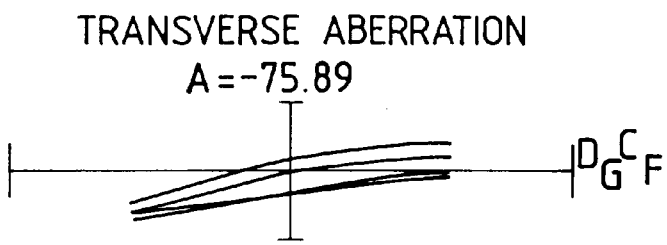
Figure 10F:
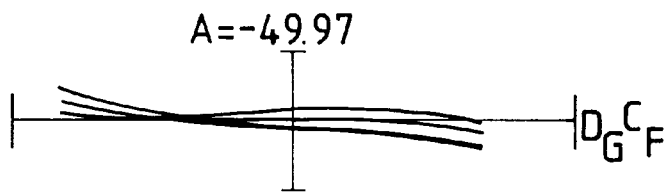
Figure 10G:
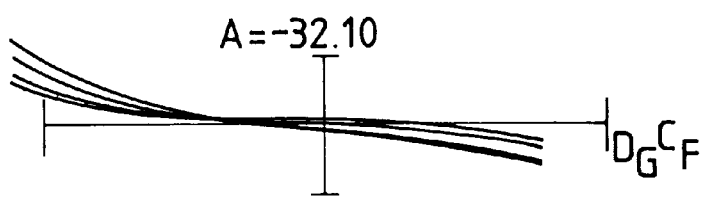
Figure 10H:
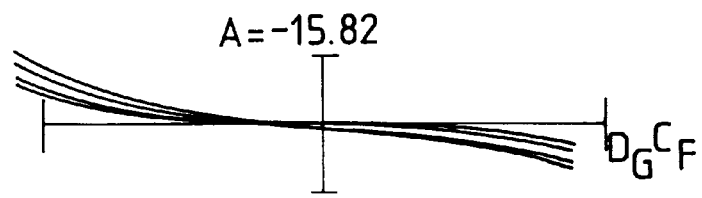
Figure 10I:
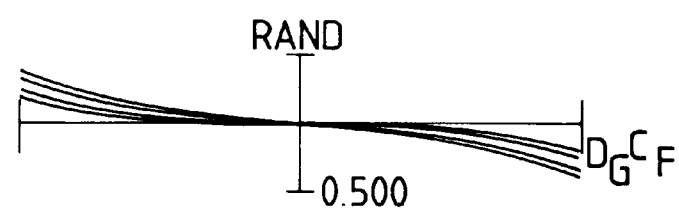
Figure 10J:
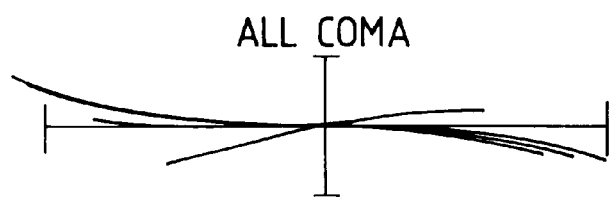

FIG. 9 is a view illustrating a configuration of the super-wide angle lens in accordance with a fifth embodiment of the present invention.

The super-wide angle lens shown in FIG. 9 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 5 shows values of various items in the fifth embodiment of the present invention. In Table 5, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and ν is the Abbe's number, respectively.

TABLE 5 f = 100.000
Bf = 197.872
FNO = 8.26
2ω = 151.8°

| | r | d | n | ν |
|---|---|---|---|---|
| 1 | ∞ | 15.0285 | 1.67025 | 57.53 |
| 2 | 75.0892 | 150.2852 | | |
| 3 | 103.9264 | 65.1236 | 1.80518 | 25.35 |
| 4 | 57.8791 | 17.5333 | 1.62041 | 60.14 |
| 5 | −170.5263 | 197.8718 | | |

(Condition corresponding values)

(1) |f1|/f = 1.120
(2) |f1|/f23 = 0.880
(3) d3/f = 0.651
(4) r3/f = 1.039
(5) r4/f = 0.579
(6) n2 − n3 = 0.185
(7) ν2 · ν3 · (n2 − n3)/(ν3 − ν2) = 8.10
(8) ν1 = 57.5
(9) r2/r1 = 0.0

FIGS. 10A to 10J are diagrams showing the variety of aberrations in the fifth embodiment.

Referring to the diagram showing the respective aberrations, FNO designates the F-number, Y represents a height of image, A denotes a semi-field angle, D shows a d-line (λ=587.6 nm, G indicates a g-line (λ=435.8 nm, C indicates a C-line (λ=656.3 nm, and F represents an F-line (λ=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Sixth Embodiment

Figure 11:
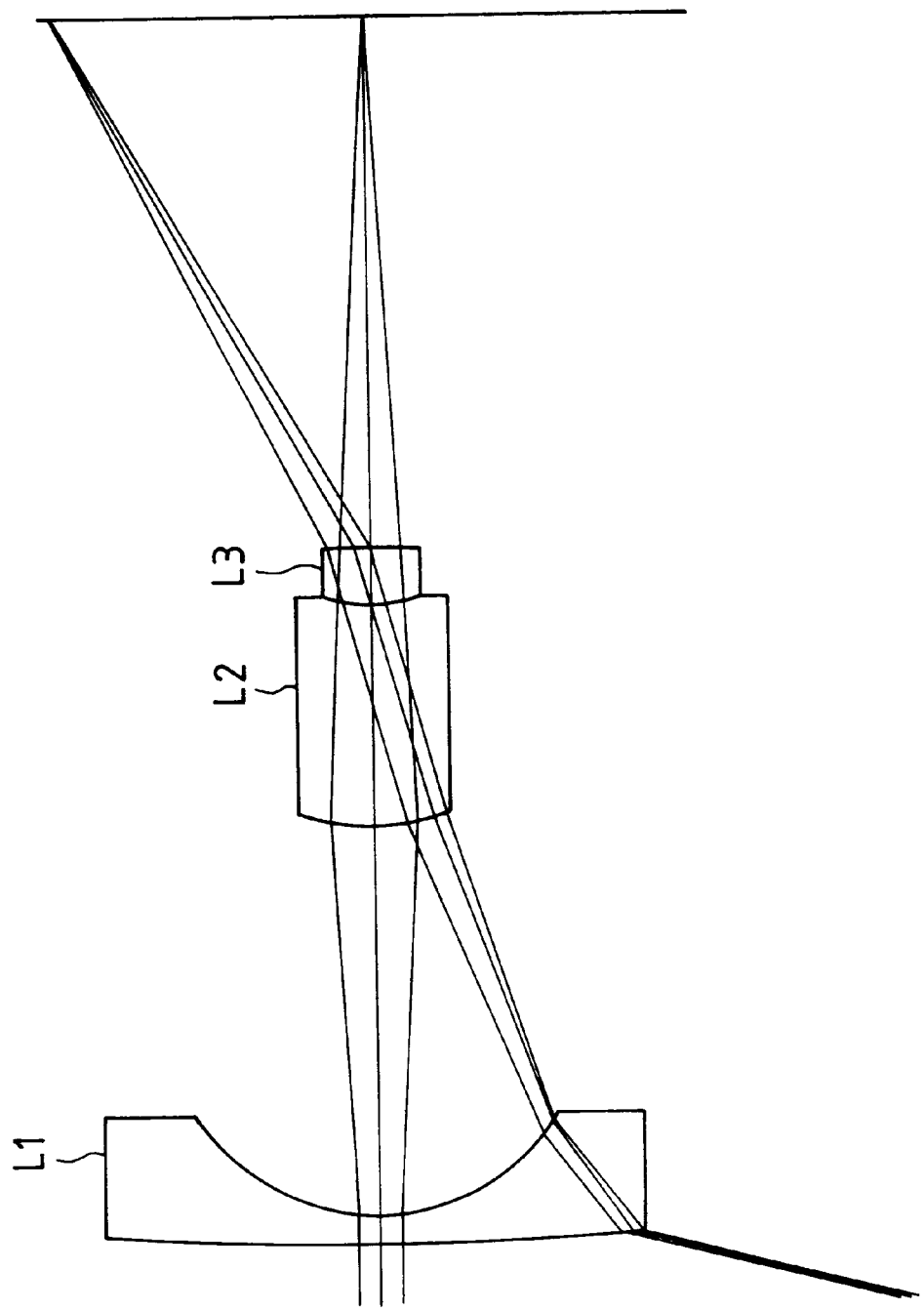
FIG. 11 is a view illustrating a configuration of the super-wide angle lens in a sixth embodiment of the present invention.
Figure 12E:
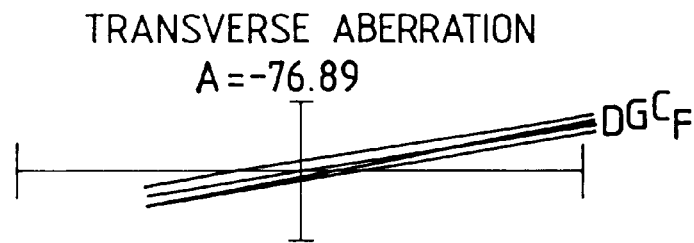
Figure 12F:
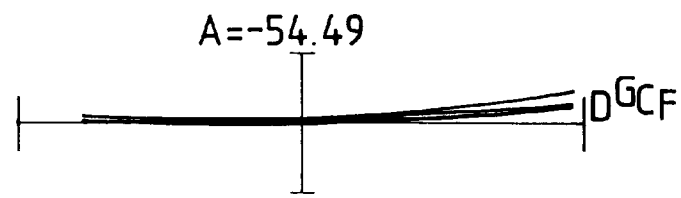
Figure 12G:
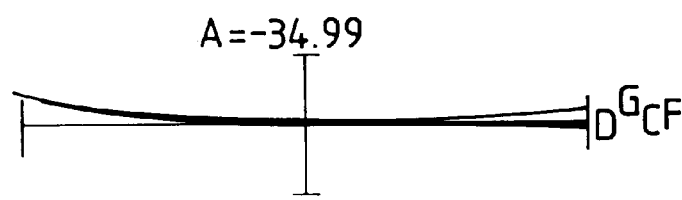
Figure 12H:
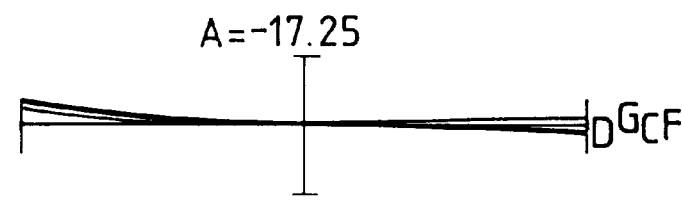
Figure 12I:
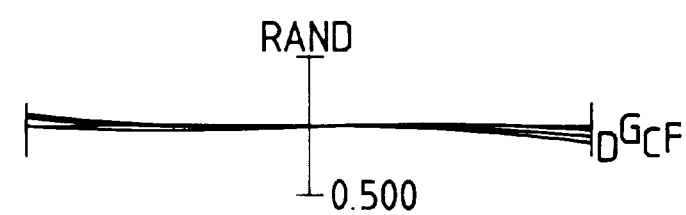
Figure 12J:
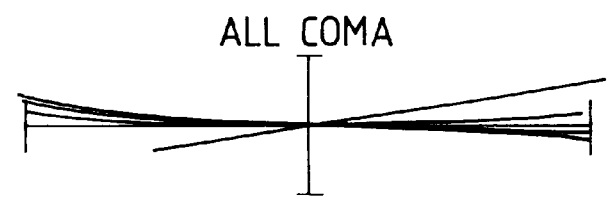

FIG. 11 is a view illustrating a configuration of the super-wide angle lens in accordance with a sixth embodiment of the present invention.

The super-wide angle lens shown in FIG. 11 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 6 shows values of various items in the sixth embodiment of the present invention. In Table 6, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and ν is the Abbe's number, respectively.

TABLE 6 f = 100.000
Bf = 199.232
FNO = 8.22
2ω = 153.8°

| | r | d | n | ν |
|---|---|---|---|---|
| 1 | 1554.4042 | 10.3627 | 1.74810 | 52.30 |
| 2 | 76.4154 | 145.0777 | | |
| 3 | 121.6702 | 82.9016 | 1.86074 | 23.01 |
| 4 | 46.1642 | 20.7254 | 1.74400 | 45.00 |
| 5 | −189.9010 | 199.2315 | | |

(Condition corresponding values)

(1) |f1|/f = 1.078
(2) |f1|/f23 = 0.838
(3) d3/f = 0.829
(4) r3/f = 1.217
(5) r4/f = 0.462
(6) n2 − n3 = 0.117
(7) ν2 · ν3 · (n2 − n3)/(ν3 − ν2) = 5.50
(8) ν1 = 52.3
(9) r2/r1 = 0.049

FIGS. 12A to 12J are diagrams showing the variety of aberrations in the sixth embodiment.

Referring to the diagram showing the respective aberrations, FNO designates the F-number, Y represents a height of image, A denotes a semi-field angle, D shows a d-line (λ=587.6 nm, G indicates a g-line (λ=435.8 nm, C indicates a C-line (λ=656.3 nm, and F represents an F-line (λ=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Seventh Embodiment

Figure 13:
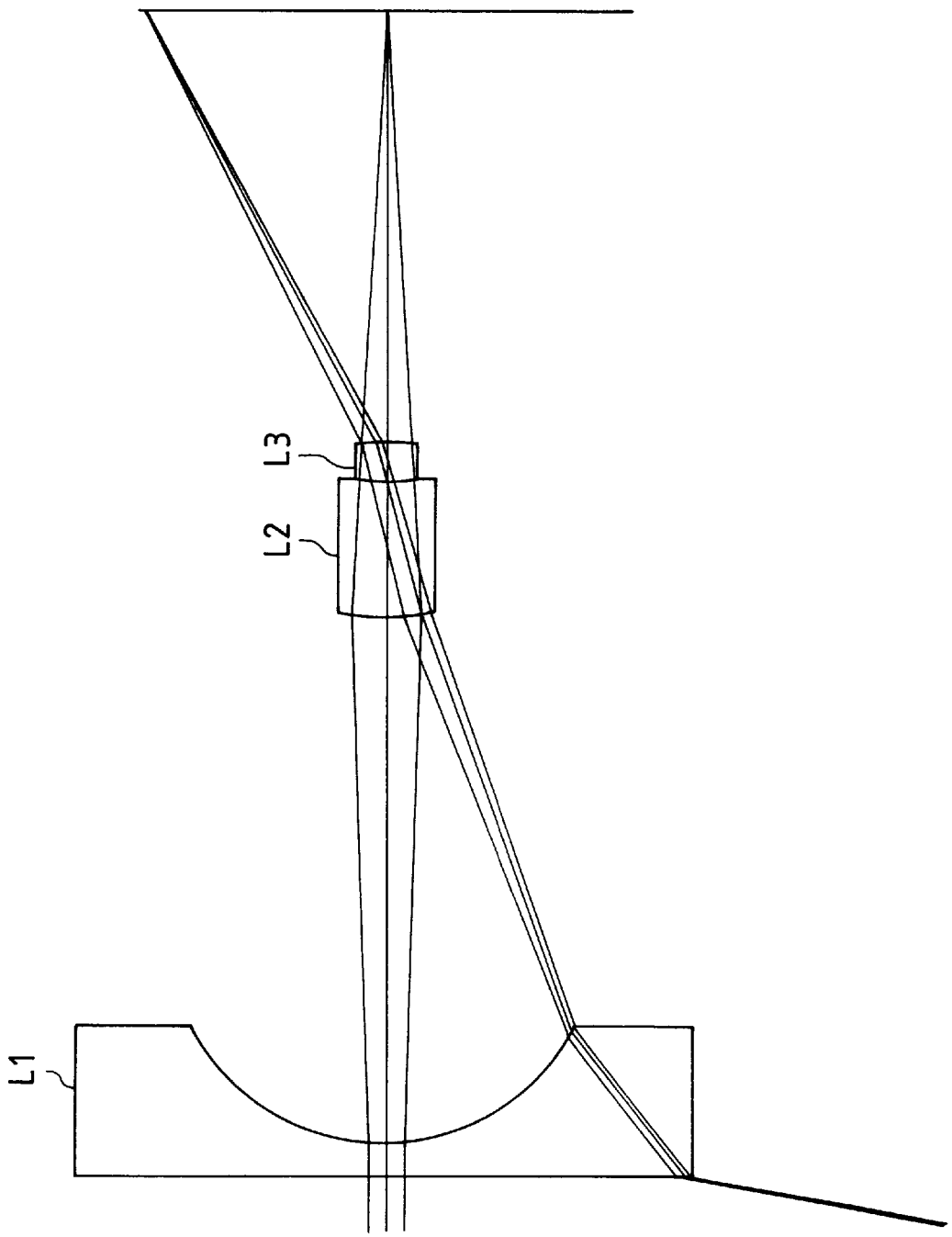
FIG. 13 is a view illustrating a configuration of the super-wide angle lens in a seventh embodiment of the present invention.
Figure 14E:
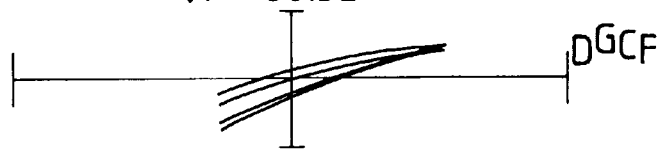
Figure 14F:
Figure 14G:
Figure 14H:
Figure 14I:
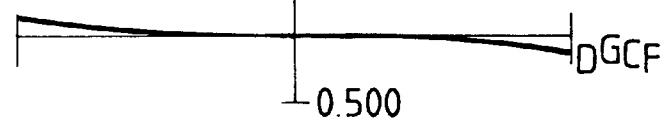
Figure 14J:
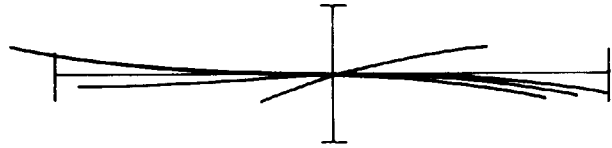

FIG. 13 is a view illustrating a configuration of the super-wide angle lens in accordance with a seventh embodiment of the present invention.

The super-wide angle lens shown in FIG. 13 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 7 shows values of various items in the seventh embodiment of the present invention. In Table 7, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and ν is the Abbe's number, respectively.

TABLE 7 f = 100.000
Bf = 198.057
FNO = 8.25
2ω = 161.0°

| | r | d | n | ν |
|---|---|---|---|---|
| 1 | ∞ | 15.0340 | 1.62041 | 60.14 |
| 2 | 97.2700 | 240.5441 | | |
| 3 | 104.7069 | 62.1406 | 1.86074 | 23.01 |
| 4 | 50.7663 | 17.5397 | 1.67025 | 57.53 |
| 5 | −409.2709 | 198.0574 | | |

(Condition corresponding values)

(1) |f1|/f = 1.568
(2) |f1|/f23 = 1.033
(3) d3/f = 0.621
(4) r3/f = 1.047
(5) r4/f = 0.508
(6) n2 − n3 = 0.190
(7) ν2 · ν3 · (n2 − n3)/(ν3 − ν2) = 7.31
(8) ν1 = 60.1
(9) r2/r1 = 0.0

TABLE 8 f = 100.000
Bf = 197.870
FNO = 8.25
2ω = 164.0°

| | r | d | n | ν |
|---|---|---|---|---|
| 1 | ∞ | 15.0285 | 1.62041 | 60.14 |
| 2 | 101.6586 | 250.6655 | | |
| 3 | 110.1737 | 69.9509 | 1.80518 | 25.35 |
| 4 | 49.3140 | 17.5333 | 1.67025 | 57.53 |
| 5 | −411.4539 | 197.8701 | | |

(Condition corresponding values)

(1) |f1|/f = 1.639
(2) |f1|/f23 = 1.052
(3) d3/f = 0.700
(4) r3/f = 1.102
(5) r4/f = 0.493
(6) n2 − n3 = 0.135
(7) ν2 · ν3 · (n2 − n3)/(ν3 − ν2) = 6.12
(8) ν1 = 60.1
(9) r2/r1 = 0.0

FIGS. 14A to 14J are diagrams showing the variety of aberrations in the seventh embodiment.

Referring to the diagram showing the respective aberrations, FNO designates the F-number, Y represents a height of image, A denotes a semi-field angle, D shows a d-line (λ=587.6 nm, G indicates a g-line (λ=435.8 nm, C indicates a C-line (λ=656.3 nm, and F represents an F-line (λ=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Eighth Embodiment

Figure 15:
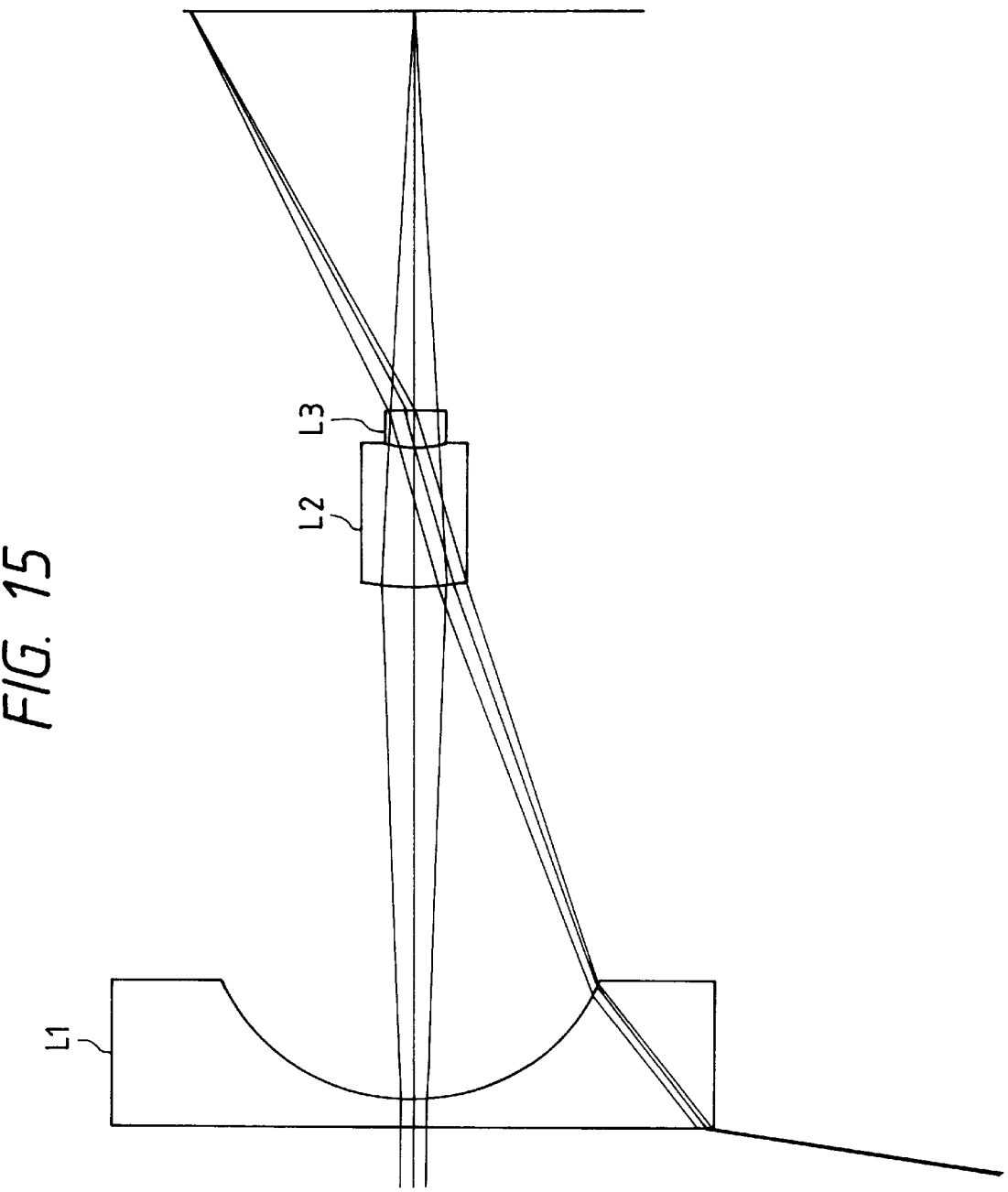
FIG. 15 is a view illustrating a configuration of the super-wide angle lens in an eighth embodiment of the present invention.
Figure 16E:
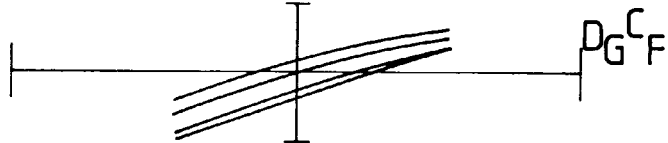
Figure 16F:
Figure 16G:
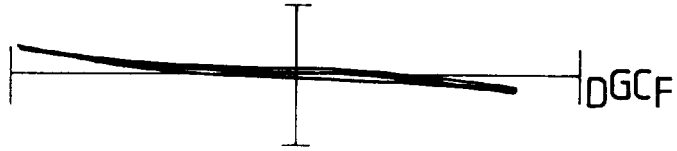
Figure 16H:
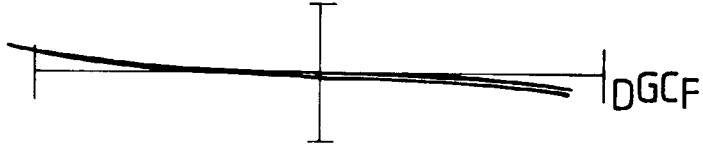
Figure 16I:
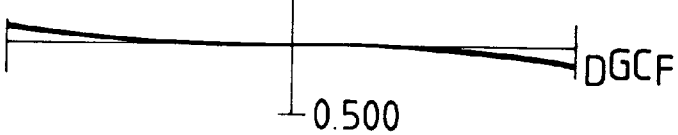
Figure 16J:
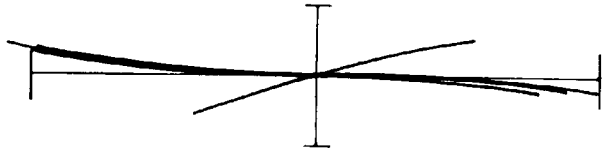

FIG. 15 is a view illustrating a configuration of the super-wide angle lens in accordance with an eighth embodiment of the present invention.

The super-wide angle lens shown in FIG. 15 is constructed of, sequentially from the object side, the plano-concave lens L1 with its concave surface toward the image side, and the cemented positive lens consisting of the negative meniscus lens L2 with its convex surface toward the object side and the biconvex lens L3.

Following Table 8 shows values of various items in the eighth embodiment of the present invention. In Table 8, f designates the focal length of the whole lens system, FNO represents the F-number, 2ω denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and ν is the Abbe's number, respectively.

FIGS. 16A to 16J are diagrams showing the variety of aberrations in the eighth embodiment.

Referring to the diagram showing the respective aberrations, FNO designates the F-number, Y represents a height of image, A denotes a semi-field angle, D shows a d-line (λ=587.6 nm, G indicates a g-line (λ=435.8 nm, C indicates a C-line (λ=656.3 nm, and F represents an F-line (λ=486.1 nm, respectively. Further, in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin (θ/2).

As obvious from the diagrams each showing the aberration, it can be understood that the variety of aberrations are well corrected in this embodiment.

Ninth Embodiment

Figure 17:
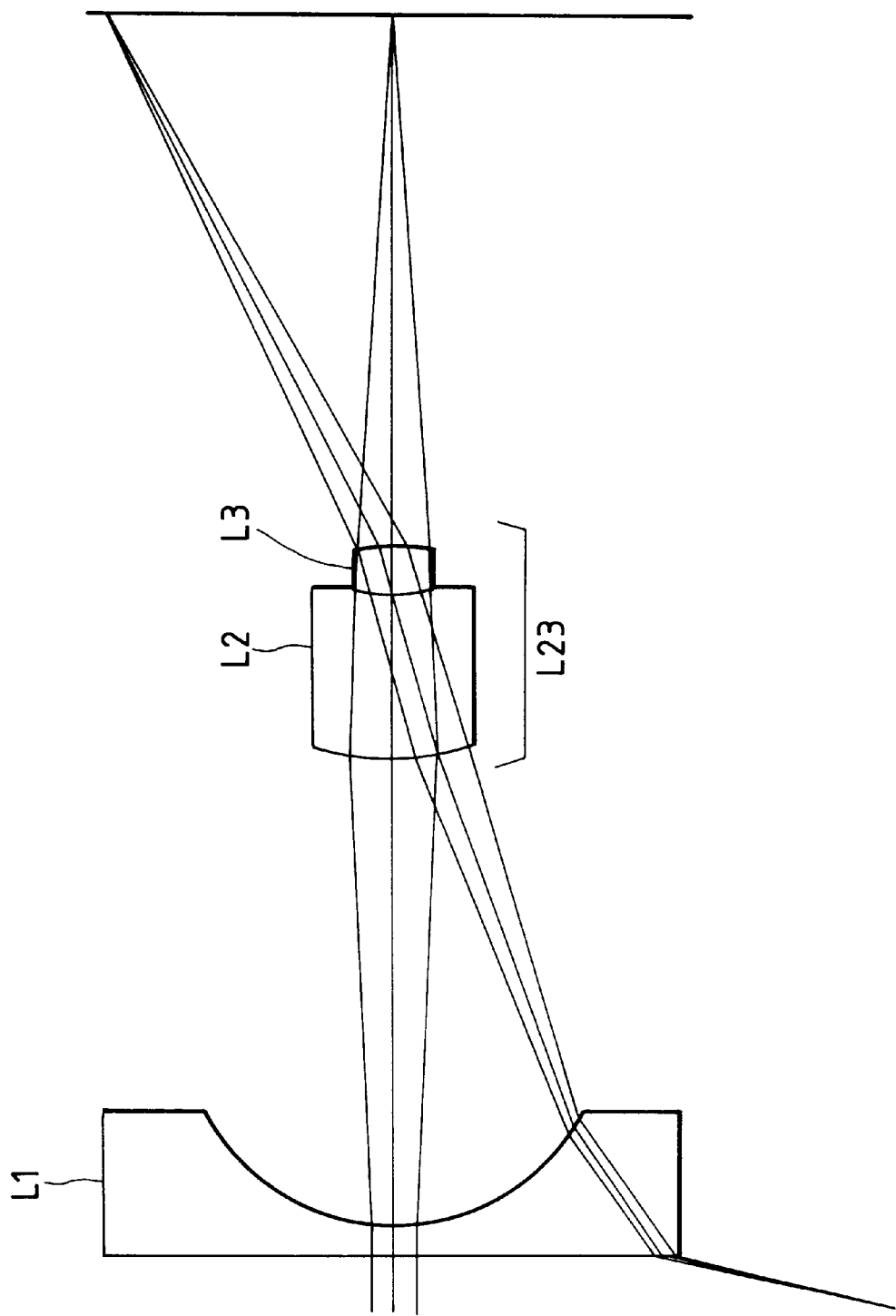
FIG. 17 is a view illustrating a configuration of the super-wide angle lens in a ninth embodiment of the present invention.
Figure 18E:
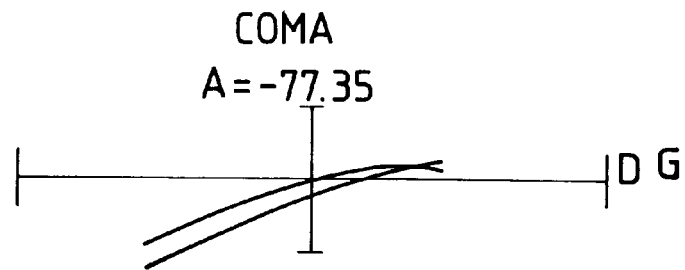
Figure 18F:
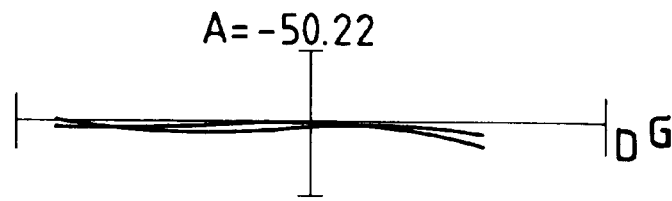
Figure 18G:
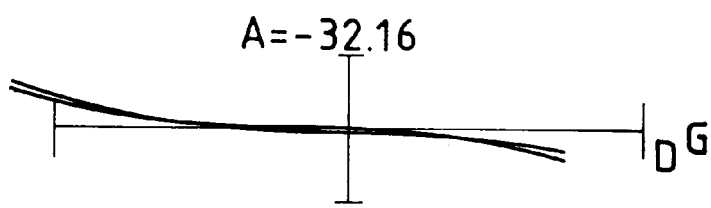
Figure 18H:
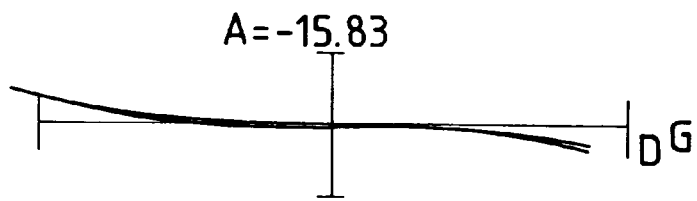
Figure 18I:
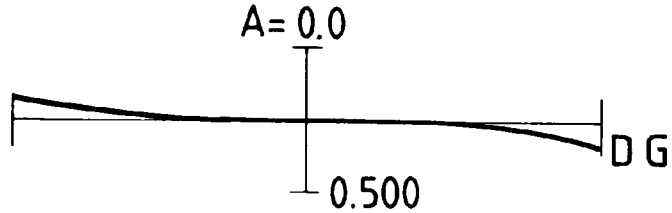

FIG. 17 is a view illustrating a configuration of the super-wide angle lens in accordance with a ninth embodiment of the present invention.

The super-wide angle lens in FIG. 17 is constructed of, sequentially from the object side, the plano-concave lens L1 with its concave surface toward the image side, and the cemented positive lens element L23 consisting of the negative meniscus lens L2 with its convex surface toward the object side and the biconvex lens L3.

Following Table 9 shows values of various items in the ninth embodiment of the present invention. In Table 9, f designates the focal length of the whole lens system, FNO represents the F-number, 2A denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and ν is the Abbe's number, respectively.

TABLE 9 f = 100.000
Bf = 201.050
FNO = 8.28
2A = 154.7°

|   | r | d | n | v |
|---|---|---|---|---|
| 1 | ∞ | 12.6929 | 1.67025 | 57.53 |
| 2 | 81.8082 | 178.7159 | | |
| 3 | 105.0454 | 62.9568 | 1.86074 | 23.01 |
| 4 | 52.2084 | 17.7701 | 1.67025 | 57.53 |
| 5 | −244.5107 | 201.0480 | | |

(Condition corresponding values)

(10) v2r3/(v1r2) = 0.514
(11) v3r3/(v2r4) = 5.031

FIGS. 18A to 18I are diagrams showing the variety of aberrations in the ninth embodiment.

Referring to the diagram showing the respective aberrations, FNO designates the F-number, A denotes a semi-field angle, D shows a d-line (λ=587.6 nm, and G indicates a g-line (λ=435.8 nm, respectively. Further in the diagram showing an astigmatism, the solid line shows a sagittal image surface, and the broken line shows a meridional image surface. Moreover, in the diagram illustrating a spherical aberration, the broken line shows a sine condition. Note that the distortion is calculated based on such a formula as y=2f·sin(θ/2).

As obvious from the diagrams each showing the aberration, it can be understood that the variety of aberrations are well corrected in this embodiment.

Tenth Embodiment

Figure 19:
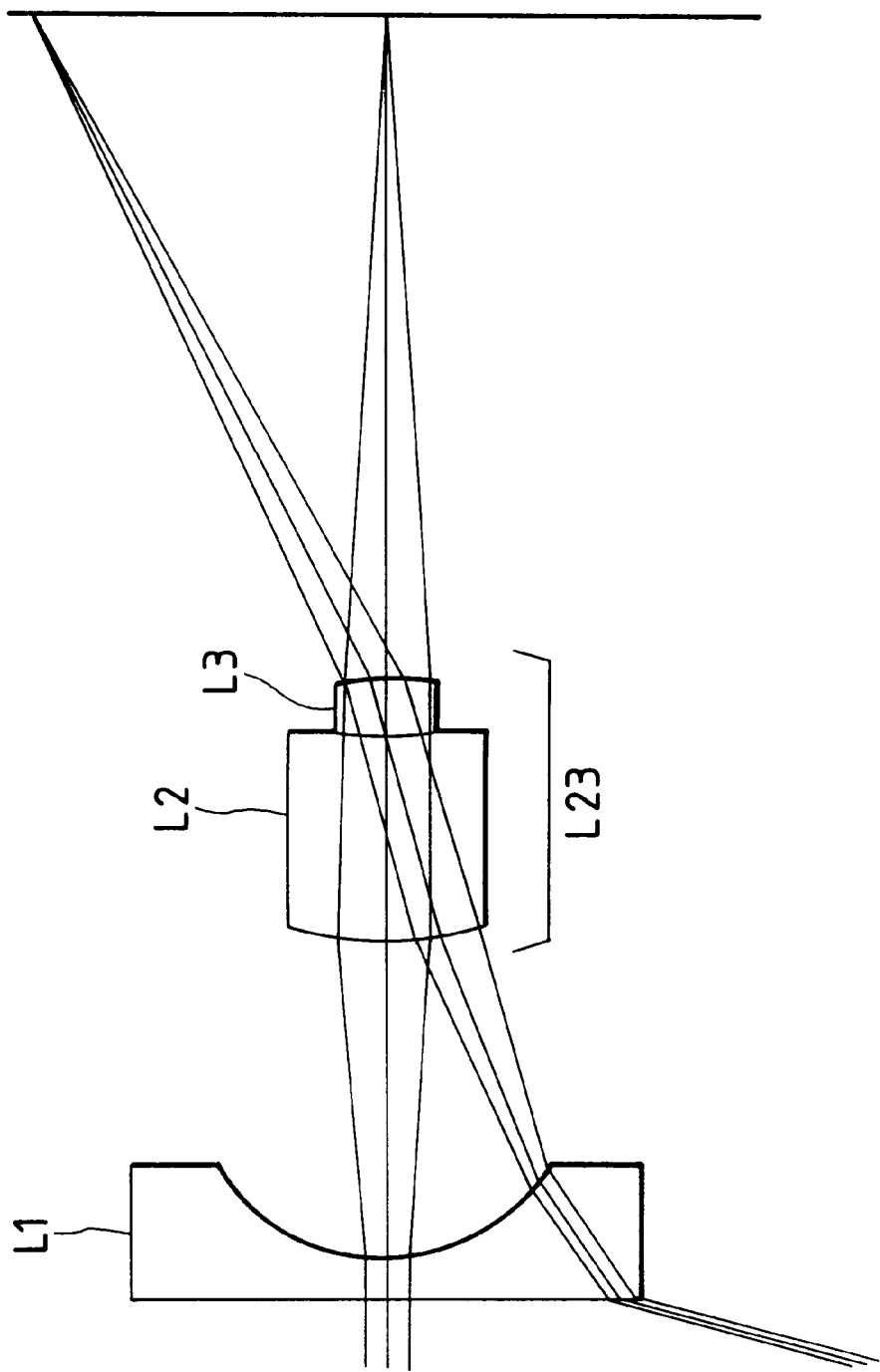
FIG. 19 is a view showing a configuration of the super-wide angle lens in a tenth embodiment of the present invention.
Figure 20E:
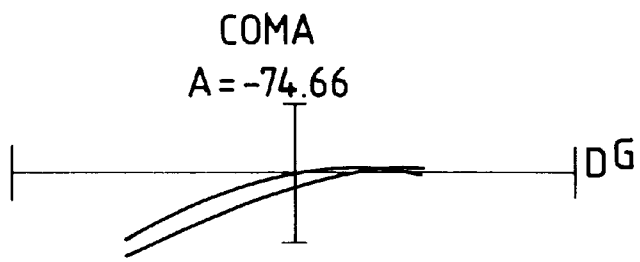
Figure 20F:
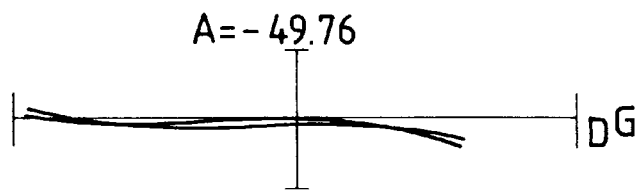
Figure 20G:
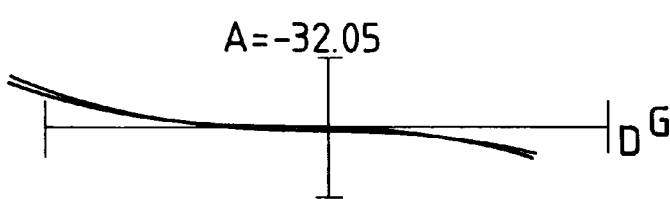
Figure 20H:
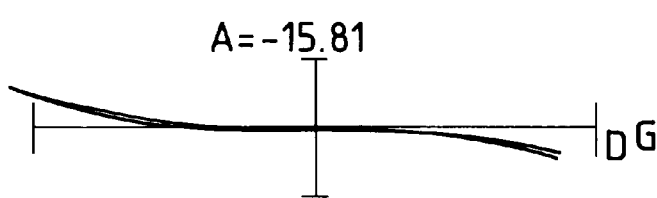
Figure 20I:
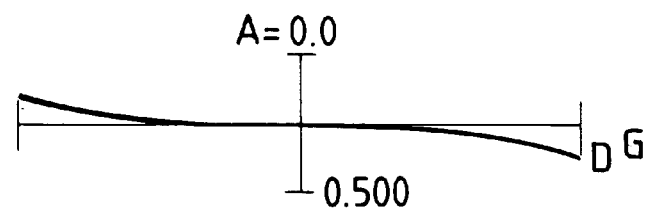

FIG. 19 is a view illustrating a configuration of the super-wide angle lens in accordance with a tenth embodiment of the present invention.

The super-wide angle lens in FIG. 19 is constructed of, sequentially from the object side, the plano-concave lens L1 with its concave surface toward the image side, and the cemented positive lens element L23 consisting of the negative meniscus lens L2 with its convex surface toward the object side and the biconvex lens L3.

Following Table 10 shows values of various items in the tenth embodiment of the present invention. In Table 10, f designates the focal length of the whole lens system, FNO represents the F-number, 2A denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and v is the Abbe's number, respectively.

TABLE 10 f = 100.000
Bf = 201.005
FNO = 8.28
2A = 149.3°

|   | r | d | n | v |
|---|---|---|---|---|
| 1 | ∞ | 13.1980 | 1.69680 | 55.60 |
| 2 | 59.2468 | 101.5228 | | |
| 3 | 108.0384 | 62.9442 | 1.86074 | 23.01 |
| 4 | 57.6475 | 17.7665 | 1.67025 | 57.53 |
| 5 | −123.6897 | 201.0048 | | |

(Condition corresponding values)

(10) v2r3/(v1r2) = 0.755
(11) v3r3/(v2r4) = 4.686

FIGS. 20A to 20I are diagrams showing the variety of aberrations in the tenth embodiment.

Referring to the diagram showing the respective aberrations, FNO designates the F-number, A denotes the semi-field angle, D shows the d-line (λ=587.6 nm, and G indicates the g-line (λ=435.8 nm, respectively. Further in the diagram showing the astigmatism, the solid line shows the sagittal image surface, and the broken line shows the meridional image surface. Moreover, in the diagram illustrating the spherical aberration, the broken line shows the sine condition. Note that the distortion is calculated based on the formula such as y=2f·sin(θ/2).

As obvious from the diagrams each showing the aberration, it can be understood that the variety of aberrations are well corrected in this embodiment.

Eleventh Embodiment

Figure 21:
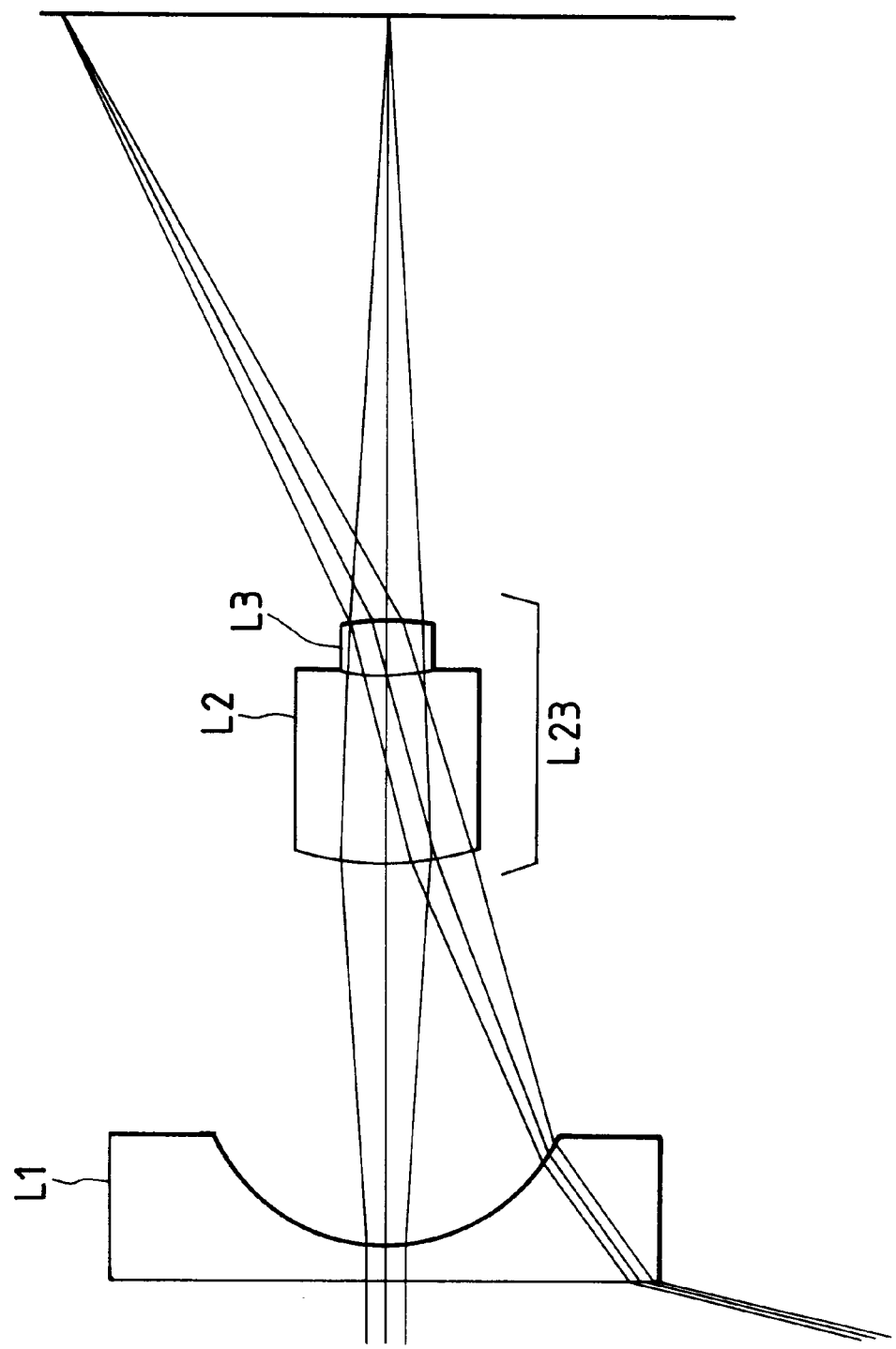
FIG. 21 is a view showing a configuration of the super-wide angle lens in an eleventh embodiment of the present invention.
Figure 22E:
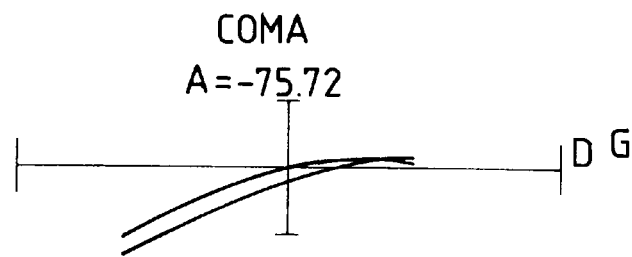
Figure 22F:
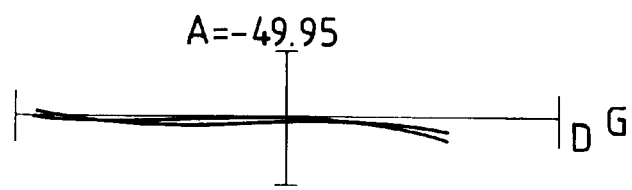
Figure 22G:
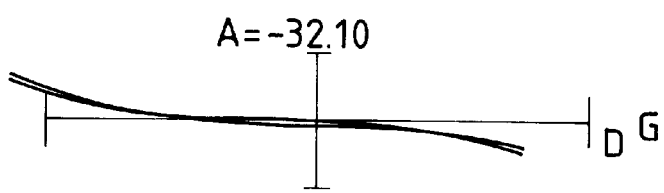
Figure 22H:
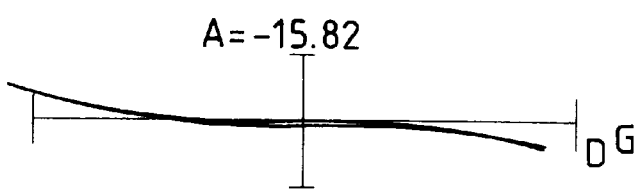
Figure 22I:
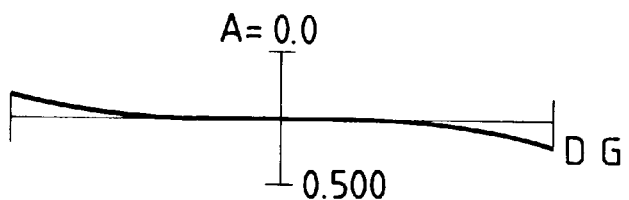

FIG. 21 is a view illustrating a configuration of the super-wide angle lens in accordance with an eleventh embodiment of the present invention.

The super-wide angle lens in FIG. 21 is constructed of, sequentially from the object side, the plano-concave lens L1 with its concave surface toward the image side, and the cemented positive lens element L23 consisting of the negative meniscus lens L2 with its convex surface toward the object side and the biconvex lens L3.

Following Table 11 shows values of various items in the eleventh embodiment of the present invention. In Table 11, f designates the focal length of the whole lens system, FNO represents the F-number, 2A denotes the field angle, and Bf represents the back-focal distance, respectively. Further, the numerals at the left end show the order of respective lens surfaces from the object side, r is the radius of curvature of each lens surface, d is the spacing between the respective lens surfaces, n is the refractive index with respect to the d-line (λ=587.6 nm, and v is the Abbe's number, respectively.

TABLE 11 f = 100.000
Bf = 201.007
FNO = 8.28
2A = 151.4°

|   | r | d | n | v |
|---|---|---|---|---|
| 1 | ∞ | 13.1980 | 1.67025 | 57.53 |
| 2 | 66.2951 | 126.9036 | | |
| 3 | 110.0268 | 62.9442 | 1.86074 | 23.01 |
| 4 | 57.1426 | 17.7665 | 1.67025 | 57.53 |
| 5 | −149.9130 | 201.0069 | | |

(Condition corresponding values)

(10) v2r3/(v1r2) = 0.664
(11) v3r3/(v2r4) = 4.814

FIGS. 22A to 22I are diagrams showing the variety of aberrations in the eleventh embodiment.

Referring to the diagram showing the respective aberrations, FNO designates the F-number, A denotes the semi-field angle, D shows the d-line (λ=587.6 nm, and G indicates the g-line (λ=435.8 nm, respectively. Further in the diagram showing the astigmatism, the solid line shows the sagittal image surface, and the broken line shows the meridional image surface. Moreover, in the diagram illustrating the spherical aberration, the broken line shows the sine condition. Note that the distortion is calculated based on the formula such as y=2f·sin(θ/2).

As obvious from the diagrams each showing the aberration, it can be understood that the variety of aberrations are well corrected in this embodiment.

As discussed above, according to the present invention, the super-wide angle lens is, though constructed of only three lens elements, has the field angle as wide as 150° or larger with the variety of well-corrected aberrations other than the distortion and can be actualized in low costs.

Note that the super-wide angle lens according to the present invention is capable of focusing by extending the lens as a whole or by moving only the first negative lens L1.

This invention being thus described, it will be obvious that the same may be varied in same ways. Such variations are not to be regarded as a departure from the spirit and scope of the invention, and all such medications as would be obvious to one skilled in the art are intended to be included within the scope of the following claims.

What is claimed is:

1. A super-wide angle lens, sequentially from an object side, comprising:
    a first negative lens L1;
    a second negative lens L2; and
    a third positive lens L3,
    wherein said first negative lens L1 with its concave surface toward an image side has an image-side surface with a curvature larger than that on an object-side surface,
    said second negative lens L2 is disposed at a predetermined spacing from said first negative lens L1 and takes a negative meniscus shape with its convex surface toward the object side,
    said third positive lens L3 has its convex surface toward the object side,
    said second negative lens L2 and said third positive lens L3 are combined to constitute a cemented lens, and
    an on-axis thickness of said second negative lens L2 is larger than an on-axis thickness of said third positive lens L3.

2. The super-wide angle lens according to claim 1, wherein said super-wide angle lens satisfies the following conditions:

$$0.8 < |f1|/f < 2.0$$

$$0.7 < |f1|/f23 < 1.3$$

where f1 is the focal length of said first negative lens L1, f23 is the synthesized focal length of said second negative lens L2 and said third positive lens L3, and f is the focal length of said whole lens system.

3. A super-wide angle lens, sequentially from an object side, comprising at least:
    a first negative lens L1;
    a second negative lens L2; and
    a third positive lens L3,
    wherein said first negative lens L1 with its concave surface toward an image side has an image-side surface with a curvature larger than that on an object-side surface,
    said second negative lens L2 is disposed at a predetermined spacing from said first negative lens L1 and takes a negative meniscus shape with its convex surface toward the object side,
    said third positive lens L3 has its convex surface toward the object side, and
    said super-wide angle lens satisfies the following conditions:

$$0.4 < d3/f < 1.0$$

$$0.7 < r3/f < 1.4$$

$$0.3 < r4/f < 0.9$$

where r3 is the radius of curvature of the object-side surface of said second negative lens L2, r4 is the radius of curvature of the image-side surface of said second negative lens, d3 is the on-axis thickness of said second negative lens L2, and f is the focal length of said whole lens system.

4. The super-wide angle lens according to claim 3, wherein said super-wide angle lens satisfies the following conditions:

$$0.08 < n2 - n3$$

$$4 < v2 \cdot v3 \cdot (n2-n3)/(v3-v2) < 12$$

where n2 is the refractive index of said second negative lens L2 with respect to the d-line, v2 is the Abbe's number of said second negative lens L2, n3 is the refractive index of said third positive lens L3 with respect to the d-line, and v3 is the Abbe's number of said third positive lens L3.

5. The super-wide angle lens according to claim 3, wherein said super-wide angle lens satisfies the following conditions:

$$0.8 < |f1|/f < 2.0$$

$$0.7 < |f1|/f23 < 1.3$$

where f1 is the focal length of said first negative lens L1, f23 is the synthesized focal length of said second negative lens L2 and said third positive lens L3, and f is the focal length of said whole lens system.

6. The super-wide angle lens according to claim 3, wherein said super-wide angle lens satisfies the following conditions:

$$45 < v1$$

$$-0.06 < r2/r1 < 0.06$$

where v1 is the Abbe's number of said first negative lens L1, r1 is the radius of curvature of the object-side surface of said first negative lens L1, and r2 is the radius of curvature of the image-side surface of said first negative lens.

7. The super-wide angle lens according to claim 3, wherein said second negative lens L2 and said third positive lens L3 are combined to constitute a cemented lens.

8. The super-wide angle lens according to claim 7, wherein said super-wide angle lens satisfies the following conditions:

$$0.08 < n2 - n3$$

$$4 < v2 \cdot v3 \cdot (n2-n3)/(v3-v2) < 12$$

where n2 is the refractive index of said second negative lens L2 with respect to the d-line, v2 is the Abbe's number of said second negative lens L2, n3 is the refractive index of said third positive lens L3 with respect to the d-line, and ν3 is the Abbe's number of said third positive lens L3.

9. The super-wide angle lens according to claim 8, wherein said super-wide angle lens satisfies the following conditions:

$$0.8<|f1|/f<2.0$$

$$0.7<|f1|/f23<1.3$$

where f1 is the focal length of said first negative lens L1, f23 is the synthesized focal length of said second negative lens L2 and said third positive lens L3, and f is the focal length of said whole lens system.

10. The super-wide angle lens according to claim 9, wherein said super-wide angle lens satisfies the following conditions:

$$45<\nu 1$$

$$-0.06<r2/r1<0.06$$

where ν1 is the Abbe's number of said first negative lens L1, r1 is the radius of curvature of the object-side surface of said first negative lens L1, and r2 is the radius of curvature of the image-side surface of said first negative lens.

11. A super-wide angle lens, sequentially from an object side, consisting of:

a first negative lens L1;

a second negative lens L2; and a third positive lens L3, wherein said first negative lens L1 with its concave surface toward an image side has an image-side surface with a curvature larger than that on an object-side surface, said second negative lens L2 is disposed at a predetermined spacing from said first negative lens L1 and takes a negative meniscus shape with its convex surface toward the object side, and said third positive lens L3 has its convex surface toward the object side.

12. The super-wide angle lens according to claim 11, wherein said super-wide angle lens satisfies the following conditions:

$$0.8<|f1|/f<2.0$$

$$0.7<|f1|/f23<1.3$$

where f1 is the focal length of said first negative lens L1, f23 is the synthesized focal length of said second negative lens L2 and said third positive lens L3, and f is the focal length of said whole lens system.

13. The super-wide angle lens according to claim 11, wherein said second negative lens L2 and said third positive lens L3 are combined to constitute a cemented lens.

14. The super-wide angle lens according to claim 13, wherein said super-wide angle lens satisfies the following conditions:

$$0.8<|f1|/f<2.0$$

$$0.7<|f1|/f23<1.3$$

where f1 is the focal length of said first negative lens L1, f23 is the synthesized focal length of said second negative lens L2 and said third positive lens L3, and f is the focal length of said whole lens system.

15. A super-wide angle lens, sequentially from an object side, comprising:

a first lens L1 having a negative refracting power;

a second lens L2 having a negative refracting power; and a third lens L3 having a positive refracting power, wherein said first lens L1 has its concave surface toward an image-side and has a larger curvature on an image-side surface than on an object-side surface, said second lens L2 is disposed at a predetermined spacing from said first lens L1, and takes a meniscus shape with its convex surface toward the object side, said third lens L3 has its convex surface toward the object side, and said second lens L2 and said third lens L3 are combined to constitute a cemented positive lens element L23 having a positive refracting power as a whole, said super-wide angle lens satisfying the following condition:

$$0.5<\nu 2 r 3/(\nu 1 r 2)<0.8$$

where r2 is the radius of curvature of the image-side surface of said first lens L1, r3 is the radius of curvature of the object-side surface of said second lens L2, ν1 is the Abbe's number of said first lens L1, and ν2 is the Abbe's number of said second lens L2.

16. The super-wide angle lens according to claim 15, wherein said super-wide angle lens satisfies the following condition:

$$4.6<\nu 3 r 3/(\nu 2 r 4)<5.05$$

where r3 is the radius of curvature of the object-side surface of said second lens L2, r4 is the radius of curvature of the image-side surface of said second lens L2, ν2 is the Abbe's number of said second lens L2, and ν3 is the Abbe's number of said third lens L3.

* * * * *

UNITED STATES PATENT AND TRADEMARK OFFICE
CERTIFICATE OF CORRECTION

PATENT NO. : 5,949,588
DATED : September 7, 1999
INVENTOR(S) : Koichi OHSHITA and Atsushi SHIBAYAMA It is certified that error appears in the above-identified patent and that said Letters Patent is hereby corrected as shown below:

On the title page, between Item "[63]" and "[51]" insert --[30] Foreign Application Priority Data
July 7, 1995 [JP] Japan - 7-195923--

Signed and Sealed this

Twentieth Day of February, 2001

Attest:

NICHOLAS P. GODICI

*Attesting Officer*   *Acting Director of the United States Patent and Trademark Office*